US011400974B2

(12) United States Patent
Watanabe et al.

(10) Patent No.: US 11,400,974 B2
(45) Date of Patent: Aug. 2, 2022

(54) TOWING ASSIST DEVICE FOR NOTIFYING DRIVER OF BACKUP CONDITIONS

(71) Applicant: AISIN CORPORATION, Kariya (JP)

(72) Inventors: Kazuya Watanabe, Anjo (JP);
Takayuki Nakasho, Anjo (JP);
Masahiko Sakabe, Kariya (JP);
Kazunori Ono, Tokai (JP)

(73) Assignee: AISIN CORPORATION, Kariya (JP)

( * ) Notice: Subject to any disclaimer, the term of this patent is extended or adjusted under 35 U.S.C. 154(b) by 184 days.

(21) Appl. No.: 16/500,154

(22) PCT Filed: Feb. 22, 2018

(86) PCT No.: PCT/JP2018/006556
§ 371 (c)(1),
(2) Date: Oct. 2, 2019

(87) PCT Pub. No.: WO2018/186045
PCT Pub. Date: Oct. 11, 2018

(65) Prior Publication Data
US 2021/0129905 A1 May 6, 2021

(30) Foreign Application Priority Data

Apr. 3, 2017 (JP) .............................. JP2017-073857

(51) Int. Cl.
*B62D 13/06* (2006.01)
*B62D 15/02* (2006.01)

(52) U.S. Cl.
CPC ........... *B62D 13/06* (2013.01); *B62D 15/027* (2013.01); *B60R 2300/808* (2013.01)

(58) Field of Classification Search
CPC .. B62D 13/06; B62D 15/027; B62D 15/0285; B60R 2300/808; B60R 99/00; B60D 1/00; B60D 1/245; B60D 1/62
See application file for complete search history.

(56) References Cited

U.S. PATENT DOCUMENTS 11,148,715 B2 * 10/2021 Perry ..................... B62D 13/06
2004/0215374 A1 * 10/2004 Shepard ................ B60T 8/1708
701/1

(Continued)

FOREIGN PATENT DOCUMENTS

GB        2544380 A  *  5/2017  ............ B62D 13/06
JP     2003-034261 A     2/2003
(Continued)

OTHER PUBLICATIONS

International Search Report of PCT/JP2018/006556 dated May 22, 2018.

*Primary Examiner* — Sze-Hon Kong
(74) *Attorney, Agent, or Firm* — Sughrue Mion, PLLC

(57) ABSTRACT

A towing assistance device includes an acquirer, a determiner, and a notifier. The acquirer acquires a coupling angle between a towing vehicle and a towed vehicle. The determiner determines whether the towed vehicle is movable backward in a coupling posture with the coupling angle maintained, when the towing vehicle is moved backward at a current steering angle. The notifier issues information on a steering angle at which the towed vehicle is movable backward in the coupling posture, among selectable steering angles of the towing vehicle.

10 Claims, 15 Drawing Sheets

(56) References Cited

U.S. PATENT DOCUMENTS

| | | |
|---|---|---|
| 2005/0030166 A1 | 2/2005 | Kraus et al. |
| 2006/0103511 A1 | 5/2006 | Lee et al. |
| 2008/0312792 A1* | 12/2008 | Dechamp ............... B62D 13/06 701/41 |
| 2012/0185131 A1 | 7/2012 | Headley |
| 2013/0158863 A1* | 6/2013 | Skvarce ............ B62D 15/0275 701/428 |
| 2014/0085472 A1* | 3/2014 | Lu ........................... B60R 1/002 348/148 |
| 2014/0218522 A1* | 8/2014 | Lavoie ................... G08G 1/167 348/148 |
| 2014/0277942 A1* | 9/2014 | Kyrtsos ................. B60W 10/18 701/41 |
| 2015/0002670 A1* | 1/2015 | Bajpai ....................... B60R 1/00 348/148 |
| 2015/0198949 A1* | 7/2015 | Boos ................. B62D 15/0285 701/2 |
| 2016/0059888 A1* | 3/2016 | Bradley ................... B60T 7/22 701/41 |
| 2016/0139599 A1* | 5/2016 | Czlapinski ............. B62D 53/08 701/41 |
| 2016/0257341 A1* | 9/2016 | Lavoie ........... B60W 30/18036 |
| 2017/0050672 A1* | 2/2017 | Gieseke ............... B60W 10/184 |
| 2017/0106865 A1* | 4/2017 | Lavoie ................. B62D 15/027 |
| 2017/0123431 A1* | 5/2017 | Ghneim ............. B60W 10/184 |
| 2017/0129403 A1* | 5/2017 | Lavoie ................. B62D 15/027 |
| 2017/0174022 A1* | 6/2017 | Hu ............................. G06T 7/20 |
| 2017/0297619 A1* | 10/2017 | Lavoie ................. B62D 15/024 |
| 2017/0320518 A1* | 11/2017 | Lavoie .................. B62D 13/06 |
| 2018/0111621 A1* | 4/2018 | Buss ................... B62D 15/027 |
| 2019/0217888 A1* | 7/2019 | Perry ................... B62D 15/028 |
| 2021/0158061 A1* | 5/2021 | Pliefke .................. B62D 13/06 |

FOREIGN PATENT DOCUMENTS

| | | |
|---|---|---|
| JP | 2005-096524 A | 4/2005 |
| JP | 2005-530220 A | 10/2005 |
| JP | 2006-256544 A | 9/2006 |
| JP | 2014-502582 A | 2/2014 |
| JP | 2016-081198 A | 5/2016 |
| JP | 2016-193703 A | 11/2016 |

* cited by examiner

TOWING ASSIST DEVICE FOR NOTIFYING DRIVER OF BACKUP CONDITIONS

CROSS-REFERENCE TO RELATED APPLICATIONS

This application is national stage application of International Application No. PCT/JP2018/006556, filed Feb. 22, 2018, which designates the United States, incorporated herein by reference, and which claims the benefit of priority from Japanese Patent Application No. 2017-073857, filed Apr. 3, 2017, the entire contents of which are incorporated herein by reference.

TECHNICAL FIELD

Embodiments of the present invention relate to a towing assistance device.

BACKGROUND ART

Conventionally, vehicles (towing vehicles) that tow vehicles (trailers) have been known. Such a towing vehicle includes, in the rear, a towing device made of a towing bracket and a coupling ball (hitch ball) to pivotably tow a vehicle. When the towing vehicle coupled to the towed vehicle travels forward, the towed vehicle travels, substantially following a steering state of the towing vehicle. Meanwhile, in backward traveling of the towing vehicle for parking, for example, that is, while the towed vehicle is pushed by the towing vehicle, the towed vehicle may move differently from the steering state of the towing vehicle. For example, depending on the coupling angle between the towing vehicle and the towed vehicle, the towed vehicle may be greatly bent at the position of the towing device, or the bending angle may decrease. In view of this, a backward driving assistance device is proposed, which creates, for example, a rearward image of the towed vehicle, a parking frame, and an expected motion trajectory relative to the parking frame from an image generated by an imaging device mounted in the rear of the towed vehicle, to display the created frame and trajectory on a display device at a driver's seat in the towing vehicle. Such a backward driving assistance device makes it easier for the driver to understand a direction of the towed vehicle and a relative position to the parking frame.

CITATION LIST

Patent Literature

Patent Document 1: JP 2006-256544 A

SUMMARY OF INVENTION

Problem to be Solved by the Invention

Conventionally, however, it is still difficult to determine how the towed vehicle behaves when the towing vehicle moves backward at the current steering angle, which greatly depends on a driver's determination. Thus, it is beneficial to notify the driver of a steering state of the towing vehicle which can easily control the behavior of the towed vehicle, making it possible to reduce a driving load of the driver when moving the towed vehicle backward.

Means for Solving Problem

According to one embodiment of the present invention, a towing assistance device includes an acquirer that acquires a coupling angle between a towing vehicle and a towed vehicle; a determiner that determines whether the towed vehicle is movable backward in a coupling posture with the coupling angle maintained, when the towing vehicle is moved backward at a current steering angle; and a notifier that issues information on a steering angle at which the towed vehicle is movable backward in the coupling posture, among selectable steering angles of the towing vehicle. The towing assistance device as configured above notifies the driver of the information on whether a coupling posture between a towing vehicle and a towed vehicle can be maintained, for example, which can facilitate backward driving of the towed vehicle with accuracy.

According to the towing assistance device of one embodiment, the determiner acquires a first turning center of the towing vehicle and a second turning center of the towed vehicle to determine whether the towed vehicle is movable backward in the coupling posture, from a positional relationship between the first turning center and the second turning center, the first turning center being defined by the steering angle of the towing vehicle and a wheelbase length of the towing vehicle, the second turning center being defined by the coupling angle and a wheelbase length of the towed vehicle. The towing assistance device as configured above determines whether the coupling posture can be maintained on the basis of turning behaviors of the towing vehicle and the towed vehicle, for example, which can easily improve accuracy of the determination.

According to the towing assistance device of one embodiment, the acquirer acquires the coupling angle from image data of a region including at least a coupling part of the towing vehicle and the towed vehicle. The towing assistance device as configured above can concurrently acquire information to determine whether the coupling posture of the towing vehicle and the towed vehicle is maintainable and information for display of the coupling state of the towing vehicle and the towed vehicle, for example, and thus, can efficiently acquire towing assistance information.

According to the towing assistance device of one embodiment, the notifier displays a predicted motion line on a display device, the predicted motion line being of the towing vehicle in the backward movement of the towing vehicle at the current steering angle, and displays information on a balancing steering angle and information on a non-balancing steering angle with the predicted motion line in different display modes, the balancing steering angle representing an angle at which the towed vehicle is movable backward in the coupling posture, the non-balancing steering angle representing an angle at which the towed vehicle is not movable backward in the coupling posture. The towing assistance device as configured above can provide visual notification of a balanced state or a non-balanced state, which allows the driver to intuitively perform a steering operation, for example.

According to the rowing assistance device of one embodiment, the notifier issues information on a balancing steering angle and information on a non-balancing steering angle by changing a mode of a steering wheel of the towing vehicle, the balancing steering angle representing an angle at which the towed vehicle is movable backward in the coupling posture, the non-balancing steering angle representing an angle at which the towed vehicle is not movable backward in the coupling posture.

The towing assistance device as configured above can allow the driver to recognize a balanced state or a non-balanced state, for example, from a change in a mode (such as vibration) of a steering wheel during steering. This makes it easier for the driver to pay attention to the surroundings of the vehicle and the vehicle posture, making it possible for the driver to focus on the driving.

According to the towing assistance device of one embodiment, the notifier issues information on a balancing steering angle and information on a non-balancing steering angle in different voice modes, the balancing steering angle representing an angle at which the towed vehicle is movable backward in the coupling posture, the non-balancing steering angle representing an angle at which the towed vehicle is not movable backward in the coupling posture. The towing assistance device as configured above facilitates checking of a balanced state or a non-balanced state, for example. This makes it easier for the driver to pay attention to the surroundings of the vehicle and the vehicle posture, making it possible for the driver to focus on the driving.

According to the towing assistance device of one embodiment, the notifier displays, on the display device, an image representing at least the towed vehicle, and displays, together with the image, as a non-balancing steering angle at which the towed vehicle is not movable backward in the coupling posture, at least one of a turning direction of the towed vehicle moving backward and a magnitude of a difference from the balancing steering angle at which the towed vehicle is movable backward in the coupling posture. The towing assistance device as configured above enables the driver to easily understand the behavior of the towed vehicle, for example.

According to the towing assistance device of one embodiment, the notifier displays an image representing at least the towed vehicle on the display device, and displays an indicator on the image in a superimposed manner, the indicator being stationary in a given position with respect to the towing vehicle and serving as a comparative criterion for behavioral change of the towed vehicle moving backward. The towing assistance device as configured above compares a comparative criterion with the behavior of the towed vehicle at the time of the towing vehicle (towed vehicle) starting moving, thereby making it easier for the driver to recognize a change in the behavior of the towed vehicle (such as a moving direction of the towed vehicle). As a result, the driver can determine whether the steering direction is correct at earlier timing, to perform appropriate steering.

According to the towing assistance device of one embodiment, the notifier displays, on a display device, an actual image based on image data of a region including a coupling part of the towing vehicle and the towed vehicle, and an overhead image of the towing vehicle and the towed vehicle coupled at the coupling angle based on the image data. The towing assistance device as configured above makes it easier for the driver to check the coupling posture of the towing vehicle and the towed vehicle, for example, to perform appropriate steering.

According to the towing assistance device of one embodiment, upon issuance of a notification request for information on a steering angle at which the towed vehicle is movable backward in the coupling posture and being unable to acquire the coupling angle between the towing vehicle and the towed vehicle, the notifier refrains from issuing the information. The towing assistance device as configured above refrains from notifying the driver of the balance information if accurate balance notification is unfeasible, upon receiving a request from the driver, for example. This can mitigate annoyance or discomfort of the driver due to insufficient information. This also makes it easier for the driver to understand an operation state of the towing assistance device.

According to the towing assistance device of one embodiment, when, in moving backward, the towing vehicle cannot transition, with a steering in an allowable steering range, to a balancing steering angle at which the towing vehicle and the towed vehicle are movable backward in the coupling posture at the maintained coupling angle, the notifier issues the information in a mode different from a mode when the towing vehicle is movable to the balancing steering angle. The towing assistance device as configured above can allow the driver to quickly recognize a situation that the vehicles cannot be returned to the balanced state during backward travel, when it occurs, for example. This enables the driver to correct his or her driving at earlier timing before the vehicles fall into a more serious situation.

DESCRIPTION OF EMBODIMENTS

Hereinafter, exemplary embodiments of the present invention are disclosed. Configurations of the embodiments below, and operations, results, and effects attained by the configurations are merely exemplary. The present invention can be implemented by configurations other than the configurations disclosed in the following embodiment, and can attain at least one of various effects based on the basic configurations and derivative effects.

Figure 1:
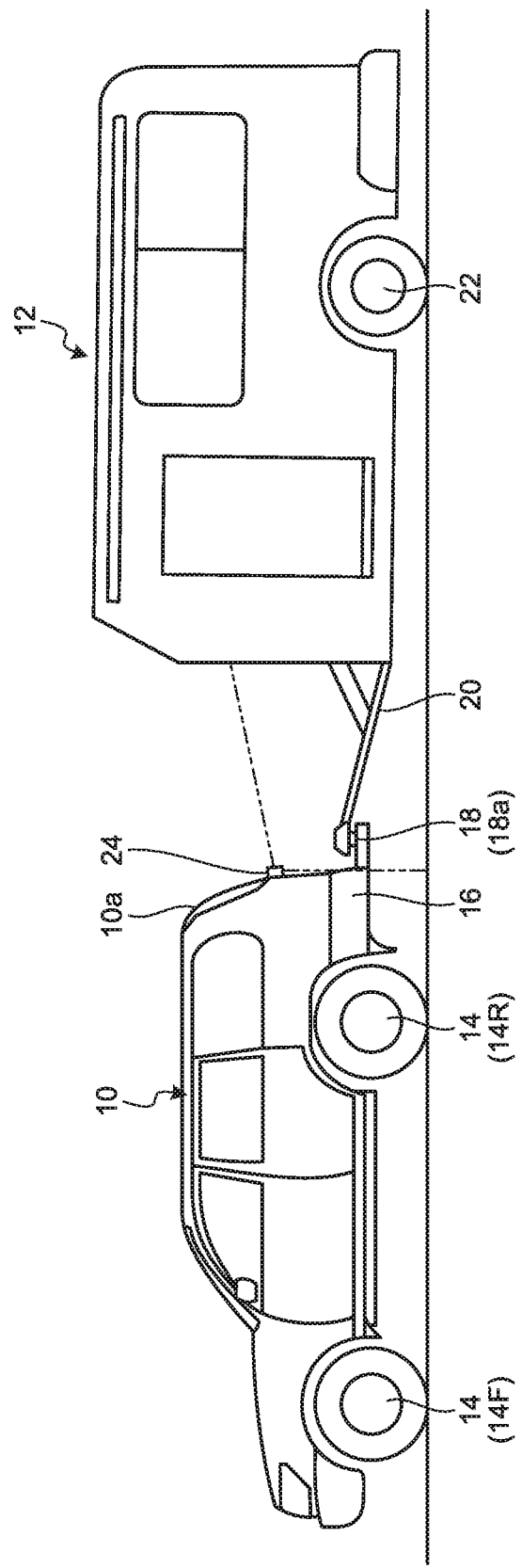
FIG. 1 is a side view schematically illustrating an exemplary coupling state between a towing vehicle equipped with a towing assistance device according to an embodiment and a towed vehicle.
Figure 2:
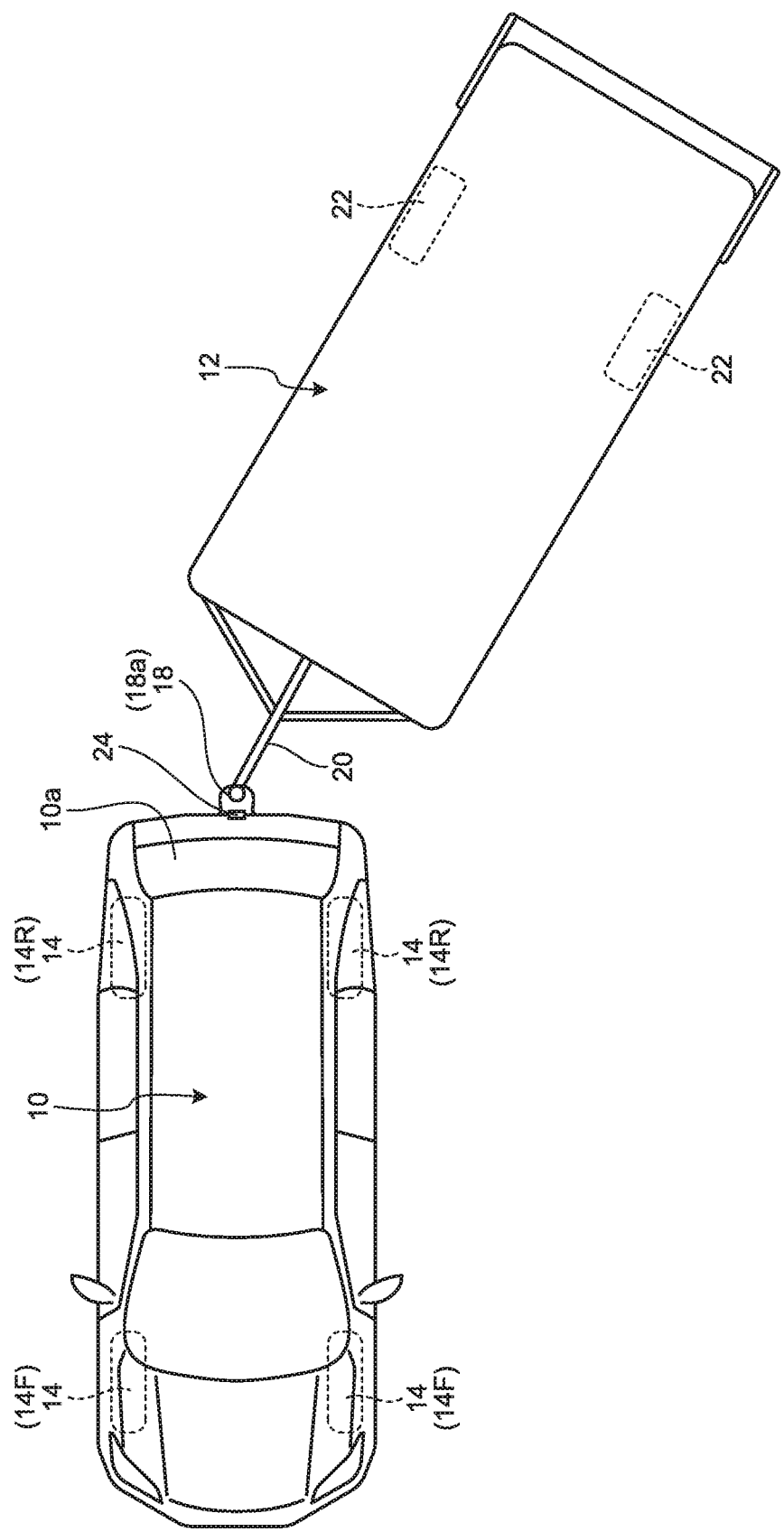
FIG. 2 is a top view schematically illustrating an exemplary coupling state between the towing vehicle equipped with the towing assistance device according to the embodiment and the towed vehicle.
Figure 3:
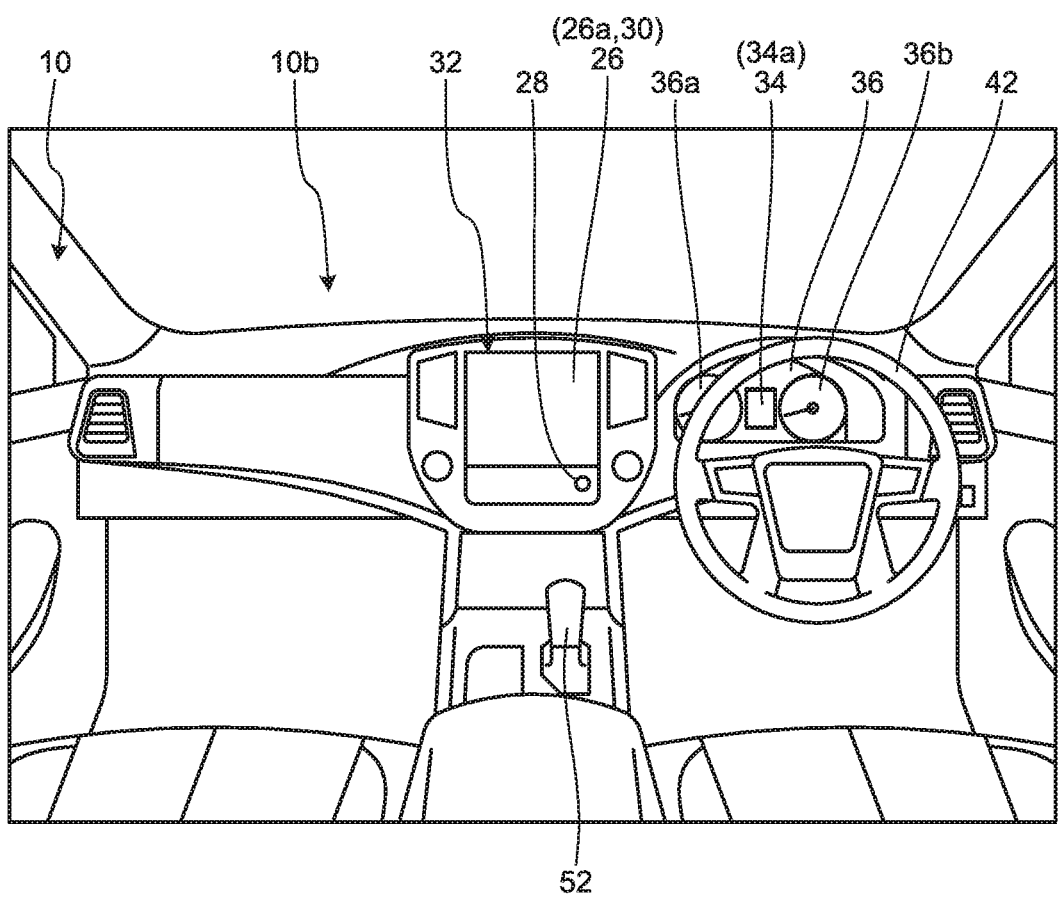
FIG. 3 is a view schematically illustrating an exemplary vehicle interior of the towing vehicle equipped with the towing assistance device according to the embodiment.

FIG. 1 is a side view illustrating a towing vehicle 10 including a towing assistance device of the embodiment and a vehicle 12 to be towed by the towing vehicle 10. In FIG. 1, left direction is defined to be frontward with respect to the towing vehicle 10, and right direction is defined to be rearward with respect to the towing vehicle 10. FIG. 2 is a top view of the towing vehicle 10 and the towed vehicle 12 illustrated in FIG. 1, and FIG. 3 is a view illustrating an exemplary vehicle interior of the towing vehicle 10 including the towing assistance device of the embodiment, viewed from the rear side of the towing vehicle 10.

The towing vehicle 10 may be, for example, an automobile (internal combustion engine automobile) including an internal combustion engine (an engine not illustrated) as a driving source, may be a vehicle (an electric vehicle or a fuel cell vehicle) including an electric motor (motor, not illustrated) as a driving source, or may be an automobile (a hybrid automobile) including both of them as a driving source. The towing vehicle 10 may be a sport utility vehicle (SUV) as illustrated in FIG. 1, or may be a pickup truck with a rear deck. The towing vehicle 10 may be a general passenger car. The towing vehicle 10 can incorporate various transmissions, and various devices (systems, parts or components) necessary to drive the internal combustion engine or the motor. Methods, the numbers, and layout of devices for driving of wheels 14 of the towing vehicle 10 can be set variously.

A towing device 18 (hitch) protrudes from, for example, below a lateral center of a rear bumper 16 of the towing vehicle 10 to tow the vehicle 12. The towing device 18 is fixed to, for example, a frame of the towing vehicle 10. The towing device 18 includes, as an example, a hitch ball having a spherical distal end that is erected in the vertical direction (vehicle up-down direction), and the hitch ball is covered with a coupler provided at the distal end of a coupling member 20 fixed to the towed vehicle 12. As a result, the towing vehicle 10 and the towed vehicle 12 are connected, and the towed vehicle 12 can swing (turn) in the vehicle width direction with respect to the towing vehicle 10. In other words, the hitch ball transmits the front, rear, left, and right motion to the towed vehicle 12 (coupling member 20), and receives acceleration or deceleration force.

The towed vehicle 12 may be a box type including at least one of a boarding space, a living space, and a storage space, for example, as illustrated in FIG. 1, and may be a rear deck type that loads luggage (such as a container or a boat). The towed vehicle 12 illustrated in FIG. 1 includes a pair of trailer wheels 22 as an example. The towed vehicle 12 of FIG. 1 is a driven vehicle including driven wheels without driving wheels and the steering wheel.

An imager 24 is mounted on a lower wall of a rear hatch 10a on the rear side of the towing vehicle 10. The imager 24 is, for example, a digital camera that incorporates an image sensor such as a charge coupled device (CCD) and a CMOS image sensor (CIS). The imager 24 can output moving image data (image data) at a given frame rate. The imager 24 has a wide-angle lens or a fish-eye lens, and can capture a horizontal range of, for example, 140° to 220°. The optical axis of the imager 24 is set obliquely downward. Thus, the imager 24 sequentially captures a region including the rear end of the towing vehicle 10, the coupling member 20, and at least the front end of the towed vehicle 12 (for example, the range indicated by a two-dot chain line, see FIG. 1), and outputs the generated region as image data. The image data generated by the imager 24 can be used to detect a coupling state (such as a coupling angle or coupling or non-coupling) between the towing vehicle 10 and the towed vehicle 12. In this case, the coupling state and the coupling angle with the towed vehicle 12 can be acquired based on the image data generated by the imager 24 located in the rear hatch 10a of the towing vehicle 10, and thus, the system configuration can be simplified and the load of computation and image processing can be reduced. In another embodiment, the towing vehicle 10 may include a plurality of imagers that images the lateral and front of the towing vehicle 10 in order to recognize the environment around the towing vehicle 10. Another imager may be provided on the lateral or the rear of the towed vehicle 12. It is possible to execute computation and image processing based on image data generated by the imagers to generate an image with a wider viewing angle or to generate a virtual overhead image (planar image) of the towing vehicle 10 seen from above.

A display device 26 and a sound output device 28 are placed in a vehicle interior 10b of the towing vehicle 10 as illustrated in FIG. 3. The display device 26 is, for example, a liquid crystal display (LCD) or an organic electroluminescent display (OELD). The sound output device 28 is a speaker as an example. In the present embodiment, the display device 26 is covered with a transparent operation input 30 (for example, a touch panel) as an example. A user (driver) can view video (an image) displayed on a screen 26a of the display device 26 via the operation input 30. In addition, the driver can touch, push, or move the operation input 30 with his or her finger at a position corresponding to the video (image) displayed on the screen 26a of the display device 26 for operation inputs (instruction inputs). In the present embodiment the display device 26, the sound output device 28, and the operation input 30 are included in a monitor device 32 located in the lateral (horizontal) center of a dashboard as an example. The monitor device 32 can include an operation input (not illustrated) such as a switch, a dial, a joystick, and a push button. In addition, a sound output device (not illustrated) can be provided in the vehicle interior 10b in a location different from the monitor device 32, and the sound output device 28 of the monitor device 32 and another sound output device can output sound. In the present embodiment the monitor device 32 doubles as a navigation system or an audio system as an example, but a monitor device for a towing assistance device may be separated from these systems.

The display device 26 displays information on whether the towing vehicle 10 and the towed vehicle 12 are in a coupling state (balanced state, coupling posture) at a substantially maintained coupling angle, for example, while the towed vehicle 12 is towed forward or backward (pushed back) by the towing vehicle 10. For example, the display device 26 notifies the driver of whether the steering angle of the towing vehicle 10 is the angle that the towed vehicle 12 can maintain the balanced state (coupling posture) with respect to the towing vehicle 10. At the coupling angle in the balanced state, the towing vehicle 10 and the towed vehicle 12 turn about the same turning center and move while behaving exhibiting substantially the same. For example, the towing vehicle 10 and the towed vehicle 12 maintaining the balanced state (coupling posture) move backward while exhibiting the behavior as one vehicle. As a result, the driver can easily understand the behavior of the towed vehicle 12 and easily move the towed vehicle 12 to, for example, a desired parking space. Meanwhile, at the coupling angle in a non-balanced state, the towed vehicle 12 starts bending (turning) according to the coupling angle along with the backward movement of the towing vehicle 10, and the coupling angle further increases or decreases with the towing device 18 as a fulcrum. That is, the towing vehicle 10 and the towed vehicle 12 behave differently, and the towed vehicle 12 starts moving in a direction different from a turning direction (moving direction) of the towing vehicle 10. This makes it difficult for the driver to understand the movement of the towed vehicle 12, which requires more advanced steering technique and steering experience. In the present embodiment, in particular, the driver can easily understand the behavior of the towed vehicle 12 while moved backward by the towing vehicle 10, by notifying the driver of the balanced state or non-balanced state.

In addition, a display device 34 different from the display device 26 may be provided inside the vehicle interior 10b. As illustrated in FIG. 3, the display device 34 is mounted, for example, in an instrument panel 36 of the dashboard between a speed display 36a and a rotational speed display 36b at the approximate center of the instrument panel 36. A screen 34a of the display device 34 is smaller in size than the screen 26a of the display device 26. The display device 34 can simply indicate, for example, whether the towed vehicle 12 is in the balanced state with the towing vehicle 10. The display device 34 may display an indicator or a mark indicating whether a current state is, for example, the balanced state in an auxiliary manner, and an image of character information. The display device 34 may display information smaller in amount than the display device 26. The display device 34 is, for example, an LCD or an OELD. The information displayed on the display device 34 may be displayed on the display device 26.

Figure 4:
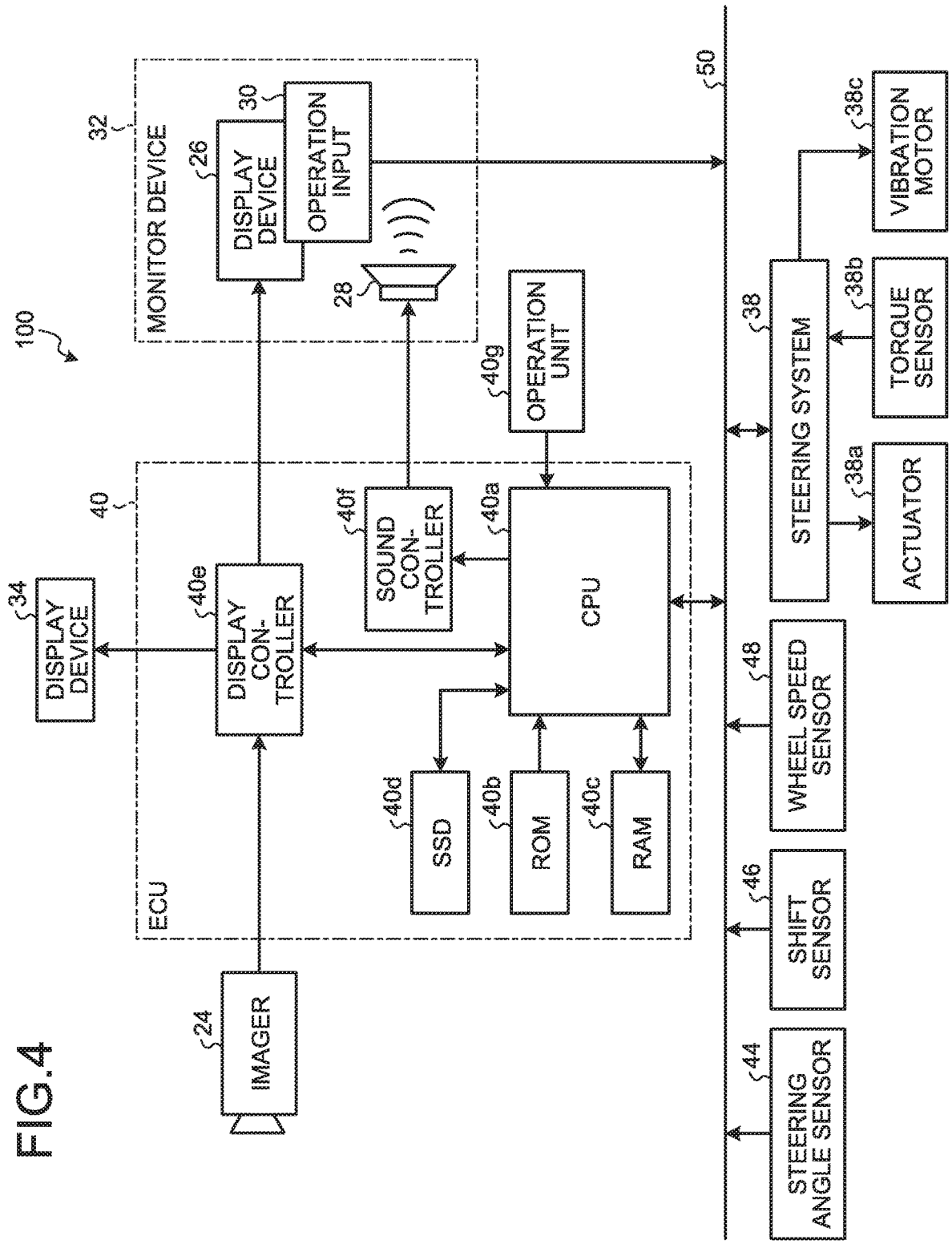
FIG. 4 is an exemplary block diagram of a configuration of a towing assistance system including the towing assistance device according to the embodiment.

The towing vehicle 10 is, for example, a four-wheeled vehicle, and includes two right and left front wheels 14F and two right and left rear wheels 14R as illustrated in FIGS. 1 and 2. Any of these four wheels 14 can be steerable. The towing vehicle 10 includes a steering system 38 that steers at least two wheels 14 as illustrated in FIG. 4. The steering system 38 includes an actuator 38a, a torque sensor 38b, and a vibration motor 38c. The steering system 38 is electrically controlled by an ECU 40 (electronic control unit) to operate the actuator 38a and the vibration motor 38c. The steering system 38 is, for example, an electric power steering system or a steer by wire (SBW) system. The steering system 38 adds a torque, that is, an assist torque to a steering 42 (a steering wheel, see FIG. 3) by the actuator 38a to aid a steering force, or steers the wheel 14 by the actuator 38a. In this case, the actuator 38a may steer a single wheel 14 or two or more wheels 14. In addition, the torque sensor 38b also detects, for example, the torque applied to the steering 42 by the driver. The vibration motor 38c can vibrate the steering 42 in a given pattern. For example, when the towing vehicle 10 and the towed vehicle 12 are in the balanced state, the steering 42 is vibrated with a given vibration pattern for a given period so that the driver can be notified of a current steering angle of the towing vehicle 10 being the steering angle that implements the balanced state.

In a towing assistance system 100 (towing assistance device) as illustrated in FIG. 4, in addition to the ECU 40, the monitor device 32, and the steering system 38, a steering angle sensor 44, a shift sensor 46, and a wheel speed sensor 48 are electrically connected via an in-vehicle network 50 serving as an electric communication line. The in-vehicle network 50 is configured, for example, as a controller area network (CAN). The ECU 40 can control the steering system 38 by transmitting a control signal through the in-vehicle network 50. In addition, the ECU 40 can receive detection results of the torque sensor 38b, the steering angle sensor 44, the shift sensor 46, and the wheel speed sensor 48 and an operation signal of the operation input 30 via the in-vehicle network 50.

The ECU 40 includes, for example, a central processing unit 40a (CPU), a read only memory 40b (ROM), a random access memory 40c (RAM), a solid state drive 40d (SSD or flash memory), a display controller 40e, and a sound controller 40f. For example, the CPU 40a can execute various types of computation and control such as image processing to the images displayed on the display devices 26 and 34, detection of the coupling state between the towing vehicle 10 and the towed vehicle 12, and notification of a result of the detection. The CPU 40a can read an installed program from a non-volatile storage device such as the ROM 40b and execute computation according to the program. The RAM 40c temporarily stores various types of data for use in the calculation by the CPU 40a. The display controller 40e mainly executes, for example, composition of image data displayed by the display devices 26 and 34, among the computation of the ECU 40. The sound controller 40f mainly processes voice data output from the sound output device 28, among the computation in the ECU 40. The SSD 40d is a rewritable non-volatile storage, and can store data upon power-off of the ECU 40. The CPU 40a, the ROM 40b, and the RAM 40c can be integrated in the same package. The ECU 40 may include another logical operation processor such as a digital signal processor (DSP) or a logic circuit, instead of the CPU 40a. The ECU 40 may include a hard disk drive (HDD) instead of the SSD 40d, and the SSD 40d and the HDD may be separated from the ECU 40.

The steering angle sensor 44 is, for example, a sensor that detects a steering amount of the steering 42 such as a steering wheel (a steering angle of the towing vehicle 10). The steering angle sensor 44 includes, for example, a Hall element. The ECU 40 acquires the steering amount of the steering 42 by the driver or the steering amount of each of the wheels 14 during automatic steering from the steering angle sensor 44 for various types of control. The steering angle sensor 44 detects a rotation angle of a rotational part of the steering 42. The steering angle sensor 44 is an exemplary angle sensor.

The shift sensor 46 is, for example, a sensor that detects a position of a movable part of a transmission operator 52 (for example, a shift lever, see FIG. 3). The shift sensor 46 can detect a position of a lever, an arm, and a button as the movable part. The shift sensor 46 may include a displacement sensor or may be formed as a switch.

The wheel speed sensor 48 is a sensor that detects the amount of rotation and rotation speed per unit time of the wheel 14. The wheel speed sensor 48 is mounted on each of the wheels 14 and outputs a wheel-speed pulse number indicating the rotation speed detected by each of the wheels 14 as a sensor value. The wheel speed sensor 48 can include, for example, a Hall element. The ECU 40 calculates the amount of movement of the towing vehicle 10 from the sensor value acquired from the wheel speed sensor 48, and executes various types of control. When calculating the vehicle speed of the towing vehicle 10 based on the sensor value of each wheel speed sensor 48, the CPU 40a determines the vehicle speed of the towing vehicle 10 from the speed of the wheel 14 having the smallest sensor value among the four wheels and executes various types of control. In addition, when one of the four wheel 14 exhibits a larger sensor value than the other wheels 14, for example, when one of the wheels 14 exhibits a higher rotation speed per unit period (unit time or unit distance) than the other wheels 14 by a given rotation speed, the CPU 40a regards the wheel 14 concerned as being in a slip state (idle state) and executes various types of control. A brake system (not illustrated) may include the wheel speed sensor 48. In such a case, the CPU 40a may acquire a result of the detection of the wheel speed sensor 48 via the brake system.

The configurations, arrangements, and electrical connection of various sensors and actuator described above are merely exemplary, and can be set (changed) in various manners.

Figure 5:
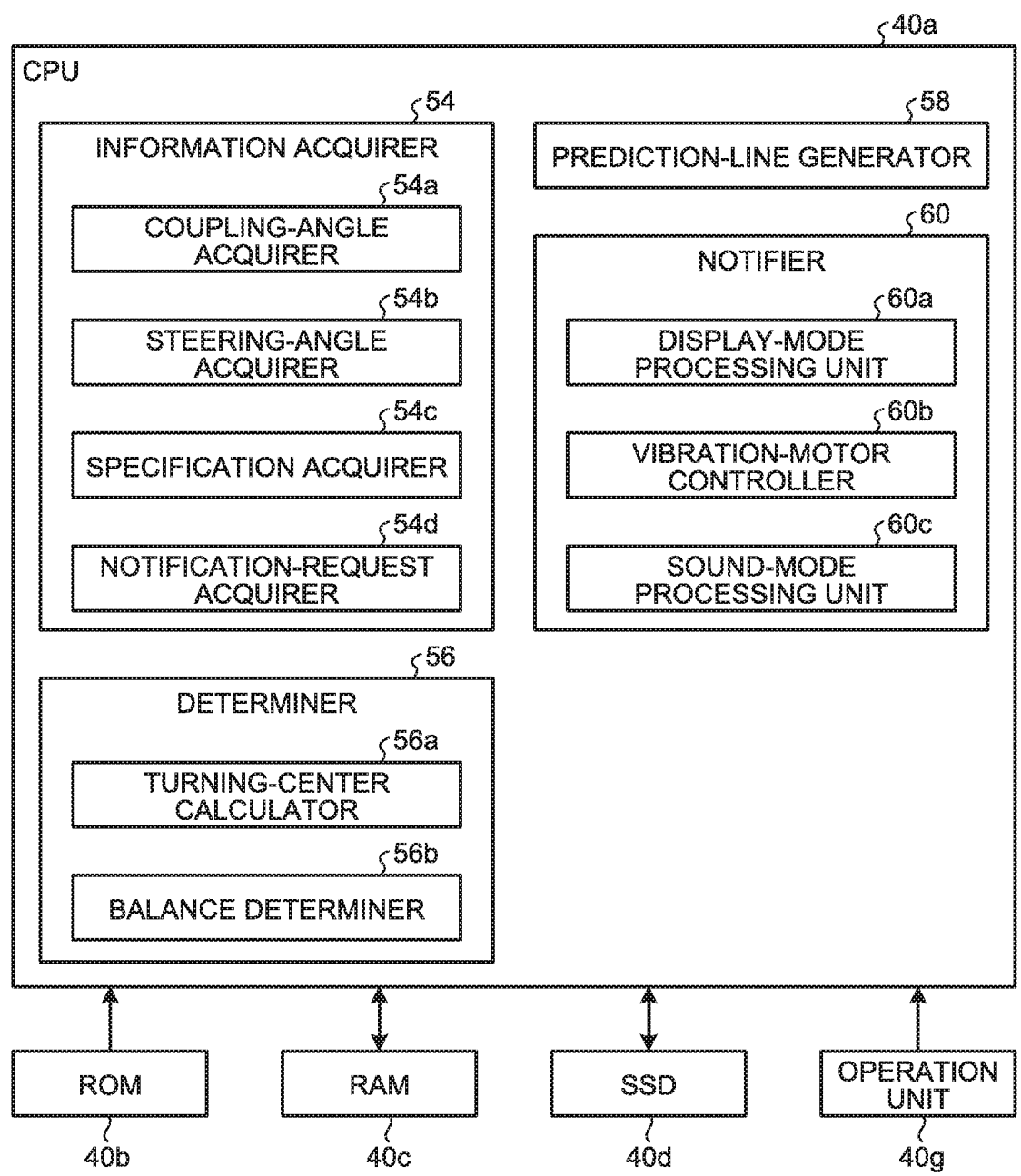
FIG. 5 is an exemplary block diagram of a configuration of a CPU of the towing assistance device according to the embodiment.

The CPU 40a of the ECU 40 includes various modules that implement notification processing for notifying whether a current steering angle of the towing vehicle 10 is of the balanced state (coupling posture) with the coupling angle between the towing vehicle 10 and the towed vehicle 12 maintained when the towing vehicle 10 tows reversely (the towed vehicle 12 is pushed back due to backward movement). The CPU 40a implements the various modules by reading and executing an installed program from a storage device such as the ROM 40b. For example, the CPU 40a includes modules such as an information acquirer 54, a determiner 56, a prediction line generator 58, and a notifier 60 as illustrated in FIG. 5.

The information acquirer 54 includes, for example, a coupling-angle acquirer 54a, a steering-angle acquirer 54b, a specification acquirer 54c, and a notification-request acquirer 54d in order to acquire various types of information in order to execute notification. The coupling-angle acquirer 54a acquires the coupling angle between the towing vehicle 10 and the towed vehicle 12, for example, an angle of the coupling member 20 with the towing device 18 as the fulcrum. This coupling angle can be obtained by various methods. For example, an image based on the image data generated by the imager 24 can be obtained by image processing.

Figure 6:
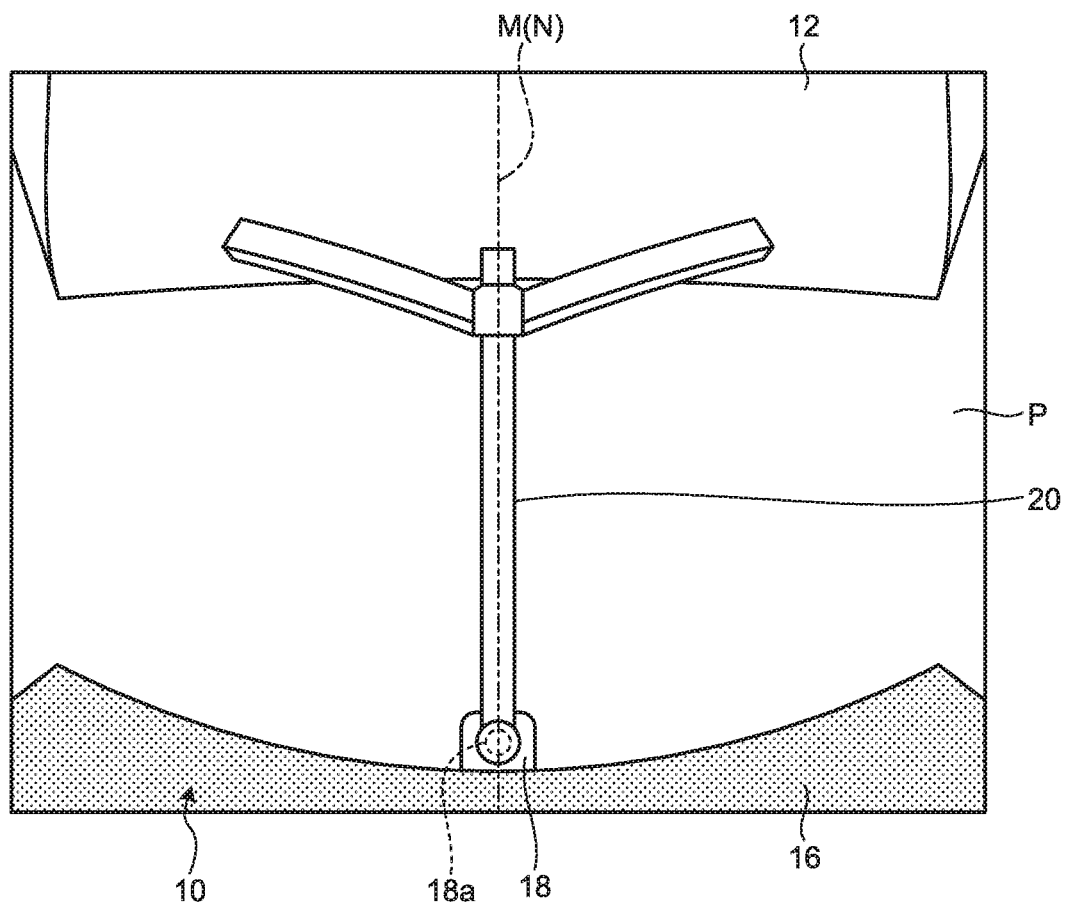
FIG. 6 is a view illustrating an exemplary image of a coupling between the towing vehicle and the towed vehicle generated by an imager of the towing assistance system including the towing assistance device according to the embodiment, the image obtained when the towed vehicle is connected straight with the towing vehicle.
Figure 7:
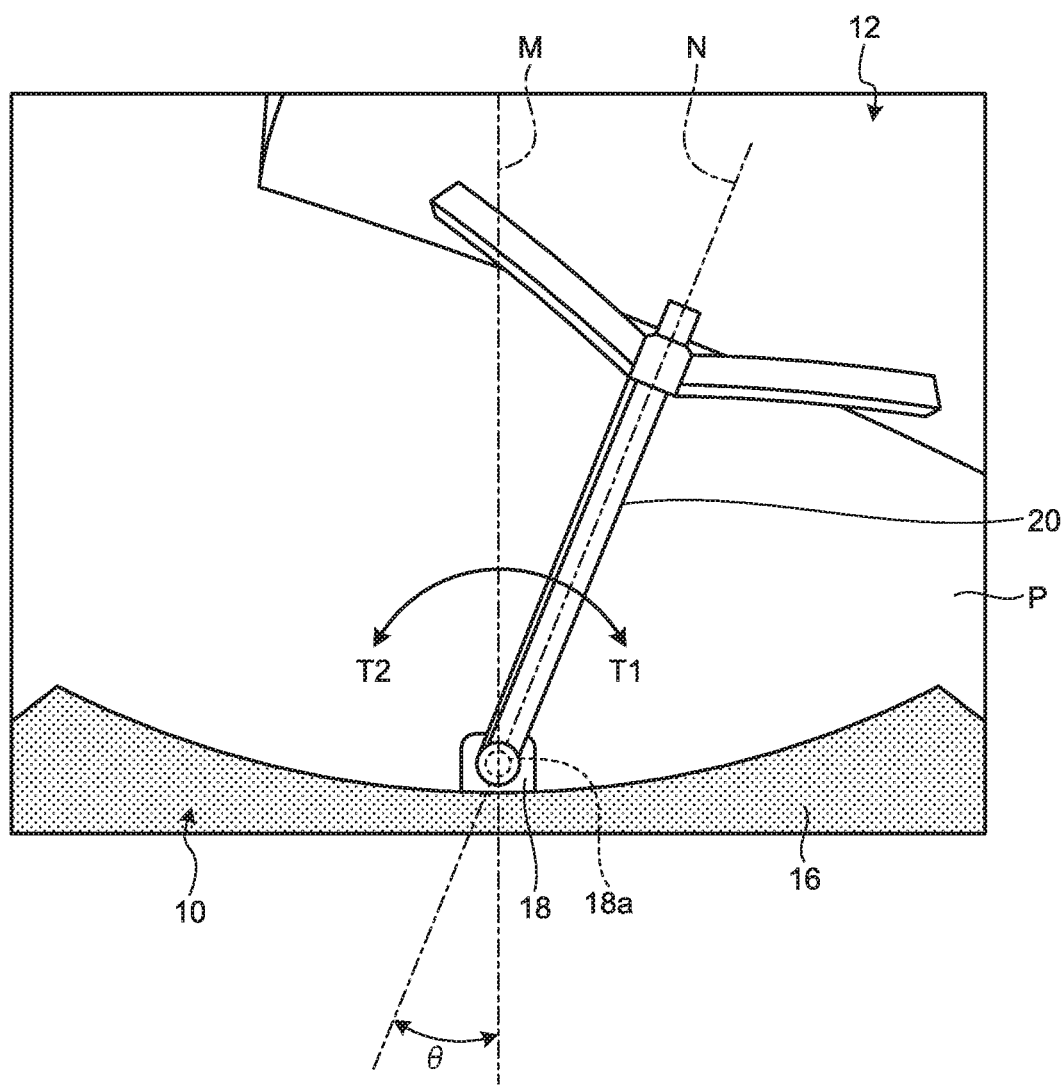
FIG. 7 is a view illustrating an exemplary image of the coupling between the towing vehicle and the towed vehicle generated by the imager of the towing assistance system including the towing assistance device according to the embodiment, when the towed vehicle is coupled to the towing vehicle at a coupling angle θ.

FIGS. 6 and 7 illustrate examples of an image P based on the image data generated by the imager 24. The image P includes the rear bumper 16 of the towing vehicle 10, the towing device 18 (a hitch ball 18a and a coupling), and a part of a distal end of the towed vehicle 12. FIG. 6 illustrates a state of the towed vehicle 12 connected straight (a coupling angle θ=0) to the towing vehicle 10. As described above, the towing device 18 is located approximately at the width center of the towing vehicle 10. That is, a lengthwise axis M of the towing vehicle 10 the towing device 18 substantially matches a coupling axis N of the coupling member 20 along the length (longitudinal direction). Meanwhile, FIG. 7 illustrates the coupling member 20 (the towed vehicle 12) turning in a direction of an arrow T1 (bent and towed), for example, to the coupling angle θ with the towing device 18 of the towing vehicle 10 as the fulcrum. In this case, the towed vehicle 12 is turning (bending) leftward as seen from the driver's seat of the towing vehicle 10.

The coupling-angle acquirer 54a detects a straight line passing through the hitch ball 18a of the towing device 18 from the image P based on the image data generated by the imager 24 to set the straight line as the coupling axis N of the coupling member 20. Since the vehicle axis M of the towing vehicle 10 on the image P generated by the imager 24 is known, the coupling angle θ can be detected from the vehicle axis M and the coupling axis N. The coupling angle when the towed vehicle 12 (the coupling member 20) is turning (bending) in a direction of an arrow T2 can be similarly detected. The present embodiment illustrates an example that the imager 24 is placed directly above the towing device 18, that is, coaxially with the vehicle axis M. That is, the coupling member 20 can be viewed from substantially directly above, which facilitates detection of the coupling angle θ between the vehicle axis M and the coupling axis N. Meanwhile, the imager 24 may not be installed directly above the towing device 18 due to the structure of the towing vehicle 10 or for other reasons. For example, the imager 24 may be installed at a position offset from the center of the rear hatch 10a leftward or rightward. In this case, it is possible to convert two-dimensional coordinates of the image P generated by the imager 24 into three-dimensional coordinates according to a ground height of the towing device 18 (the hitch ball 18a) (known value from specifications), to detect the coupling angle θ according to the vehicle axis M and the coupling axis N.

In another embodiment, for example, an angle sensor may be placed on the towing device 18 or the periphery thereof to detect an angle of the coupling member 20 with respect to the towing device 18 and set the angle as the coupling angle θ. This can reduce a processing load of the CPU 40a.

The steering-angle acquirer 54b acquires the steering angle of the towing vehicle 10 detected by the steering angle sensor 44. That is, the steering-angle acquirer 54b acquire the steering angle in the direction in which the driver is about to drive the towing vehicle 10 (the towed vehicle 12). The steering-angle acquirer 54b may acquire a movable forward or backward state of the towing vehicle 10 from a position of the movable part of the transmission operator 52 output by the shift sensor 46, to know that the current steering angle is of forward moving or backward moving.

Figure 8:
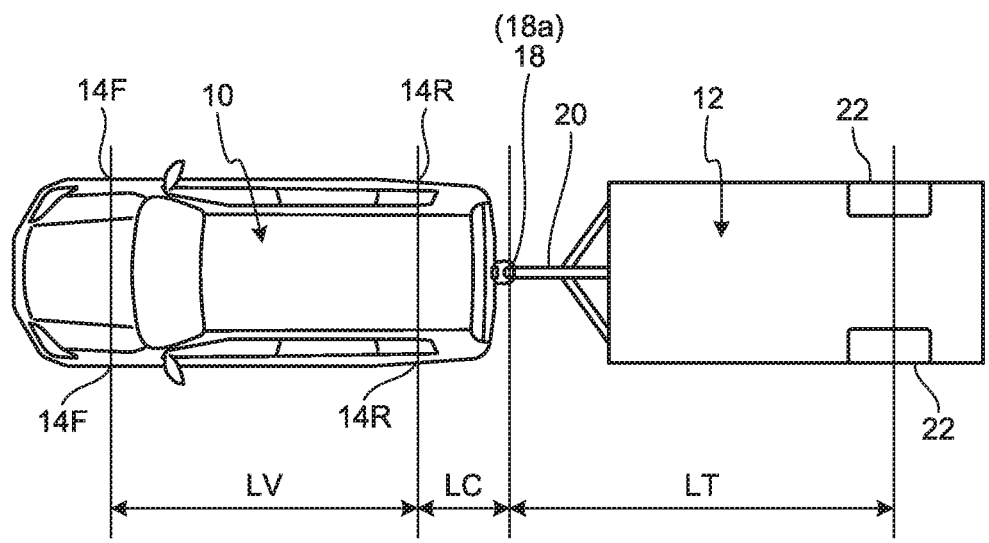
FIG. 8 is a view illustrating a length of a wheelbase of the towed vehicle in the towing assistance device according to the embodiment.

The specification acquirer 54c mainly acquires specifications of the towed vehicle 12. Whether the towing vehicle 10 and the towed vehicle 12 are in the balanced state described above can be determined based on whether a turning center of the towing vehicle 10 coincides with a turning center of the towed vehicle 12, as an example. The towing vehicle 10 and the towed vehicle are in the balanced state when both the turning centers coincide with each other. Then, the turning center of the towing vehicle 10 can be acquired based on the current steering angle of the towing vehicle 10 and a wheelbase length LV of the towing vehicle 10 (see FIG. 8). The turning center of the towed vehicle 12 can be acquired based on the coupling angle θ between the towing vehicle 10 and the towed vehicle 12 and a wheelbase length LT of the towed vehicle 12 (see FIG. 8). The wheelbase length LT of the towed vehicle 12 is a length from the towing device 18 to an axle of trailer wheels 22 of the towed vehicle 12 including the coupling member 20. However, the towed vehicle 12 of various specifications can be connected to the towing vehicle 10, and the wheelbase length LT differs depending on the specifications of the towed vehicle 12. The specification acquirer 54c may acquire the wheelbase length LT of the towed vehicle 12 to couple from a driver's direct input to the operation input 30 of the monitor device 32, or estimate a value from the towing vehicle 10's towing the towed vehicle 12 forward and regard the estimate as the wheelbase length LT. In the case of the driver's directly inputting the wheelbase length LT, for example, the specifications of the towed vehicle 12 can be referred to.

Figure 9:
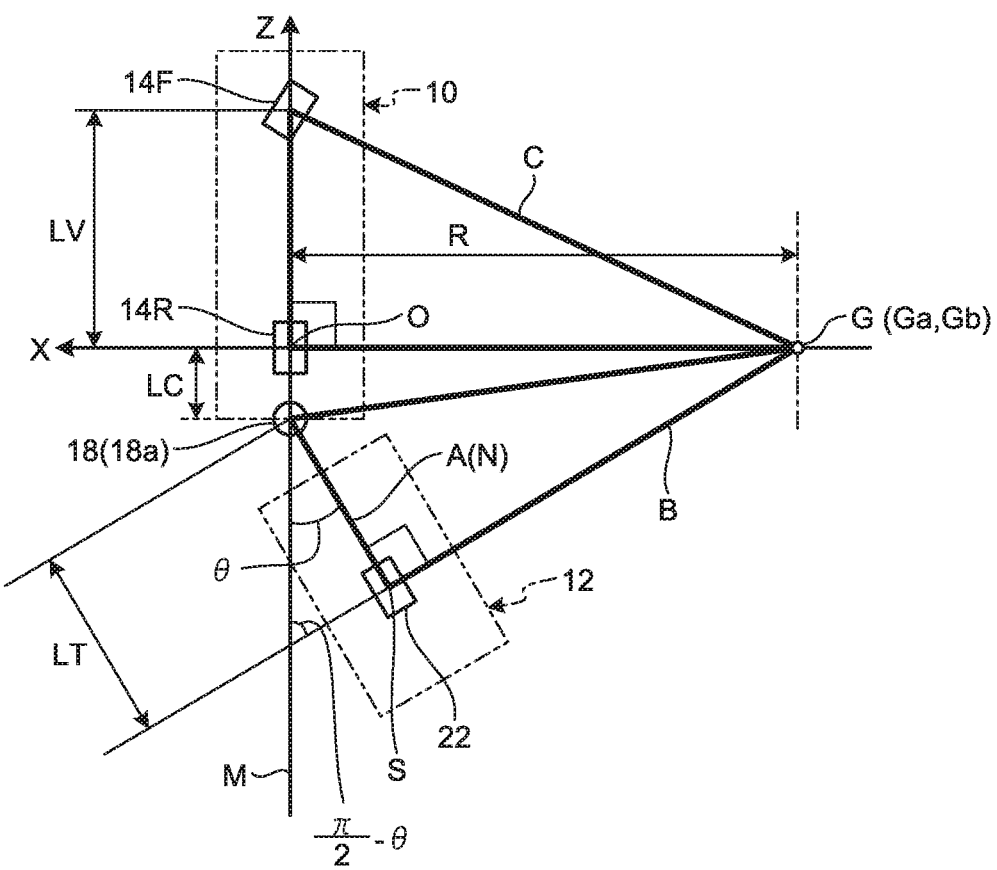
FIG. 9 is a view illustrating an exemplary calculation of the length of the wheelbase of the towed vehicle in the towing assistance device according to the embodiment.

FIG. 9 is a schematic view illustrating an exemplary method of estimating the wheelbase length LT of the towed vehicle 12. In the case of FIG. 9, a description will be given using a model in which all the front wheel 14F, the rear wheel 14R of the towing vehicle 10 and the trailer wheel 22 of the towed vehicle 12 are located at the center in the vehicle width direction, that is, on an axis extending in the vehicle front-rear direction (the front wheel 14F and the rear wheel 14R are located on the vehicle axis M, and the trailer wheel 22 are located on the coupling axis N) for the sake of simplicity.

As described above, whether the towing vehicle 10 and the towed vehicle 12 are in the balanced state can be determined using the calculated turning centers of the towing vehicle 10 and the towed vehicle 12 based on the coupling angle θ between the towing vehicle 10 and the towed vehicle 12, the steering angle of the towing vehicle 10, the wheelbase length LV f the towing vehicle 10, and the wheelbase length LT of the towed vehicle 12. In other words, when the towing vehicle 10 and the towed vehicle 12 are in the balanced state at the coupling angle θ, the wheelbase length LT of the towed vehicle 12 can be calculated back based on such a state. When the towing vehicle 10 is towing the towed vehicle 12 forward with a constant turning radius (followed towing), it is possible to easily set the towing vehicle 10 and the towed vehicle 12 in the coupling posture that enables the balanced state at the coupling angle θ.

FIG. 9 is a view illustrating the towing vehicle 10 traveling forward (towing forward) with the turning radius R about the turning center G on X-Z coordinate. In the case of FIG. 9, it is assumed that the rear wheel 14R of the towing vehicle 10 is located at an origin O of the X-Z coordinate, and that the steering angle of the front wheel 14F of the towing vehicle 10 is steered to an angle that enables the rear wheel 14R to turn with the turning radius R. As described above, when the towing vehicle 10 maintains a constant steering angle and continues forward travel (turning), the towed vehicle 12 is driven to travel about the same turning center G (Ga, Gb) as the towing vehicle 10 while maintaining the coupling angle θ with respect to the vehicle axis M of the towing vehicle 10 with the towing device 18 fixed to the towing vehicle 10 as a fulcrum. The wheelbase length LV of the towing vehicle 10 and a hitch distance LC from an axle position of the rear wheel 14R to the towing device 18 are known from the specifications of the towing vehicle 10, and the turning radius R can be calculated from a detection result of the steering angle sensor 44 of the towing vehicle 10. In addition, the coupling angle θ is acquirable based on the image data generated by the imager 24 of the towing vehicle 10. When the towed vehicle 12 is turning in the balanced state about the turning center G, the axle of the trailer wheel 22 of the towed vehicle 12 is located at a position where a straight line passing through the turning center G and the coupling axis N is orthogonal to each other. Thus, information (for example, a formula of a straight line A) indicating the straight line A that passes through the towing device 18 and has an inclination of the coupling angle θ is acquired first in FIG. 9. In addition, the turning center G (coordinates) can be acquired from the steering angle of the towing vehicle 10 and the wheelbase length LV. It is possible to acquire information (for example, a formula of a straight line B) indicating the straight line B that passes through the turning center G and has an inclination of $(\pi/2)-\theta$ and acquire information (coordinates) on an intersection point S between the straight line A and the straight line B. Then, it is possible to estimate a length of the wheelbase length LT of the towed vehicle 12 based on the coordinates of the towing device 18 and the coordinates of the intersection point S.

The notification-request acquirer 54d acquires information indicating whether the towing assistance system 100 is required to issue balance notification regarding the balanced state of the towing vehicle 10 and the towed vehicle 12. The balance notification is normally executed when the towing vehicle 10 is connected to the towed vehicle 12. Thus, the notification-request acquirer 54d acquires information indicating whether the towed vehicle 12 is currently connected to the towing vehicle 10. The notification-request acquirer 54d can receive coupling or non-coupling of the towed vehicle 12, for example, via an operation unit 40g (see FIGS. 4 and 5) including a push button switch, a toggle switch, and a rotary switch. The towing device 18 may include a coupling detection device to detect coupling or non-coupling, or the coupling or non-coupling may be determined by analyzing an image based on the image data generated by the imager 24. When the notification-request acquirer 54d acquires the information indicating the coupling of the towed vehicle 12, the specification acquirer 54c may display a specification-input request screen on the display device 26 of the monitor device 32. For example, the specification acquirer 54c may display a screen for receiving the input of the wheelbase length LT of the towed vehicle 12. If the driver inputs information that the wheelbase length LT is unknown, the specification acquirer 54c may estimate and acquire the wheelbase length LT by forward travel (towing forward) as described above. In addition, whether the towing vehicle 10 and the towed vehicle 12 are in the balanced state is mainly used when the towing vehicle 10 coupled to the towed vehicle 12 travels backward. Thus, the notification-request acquirer 54d may acquire information indicating whether the transmission operator 52 has shifted to a reverse position (R range) via the shift sensor 46. Thus, the notification-request acquirer 54d may regard that the balance notification request has been made when the towed vehicle 12 is connected and the transmission operator 52 is shifted to the R range.

Returning to FIG. 5, when the towing vehicle 10 is moved backward at the current steering angle of the towing vehicle 10, the determiner 56 determines whether the towed vehicle 12 is movable backward in the coupling posture maintaining the coupling angle θ. For this determination, the determiner 56 includes, for example, a turning-center calculator 56a and a balance determiner 56b. For example, assuming that the rear wheel 14R of the towing vehicle 10 be located at the origin O on the X-Z coordinate as illustrated in FIG. 9, a position of the front wheel 14F is determined on the Z axis if the wheelbase length LV of the rowing vehicle 10 is known. Then, an intersection point between an extension line (straight line C) of an axle of the front wheel 14F at the current steering angle and the X axis is set to the turning center G of the towing vehicle 10. That is, when the towing vehicle 10 travels at the current steering angle, the turning-center calculator 56a can acquire the first turning center Ga of the towing vehicle 10 based on the steering angle and the wheelbase length LV of the towing vehicle 10. In addition, in the case of the towed vehicle 12, the position of the trailer wheel 22 of the towed vehicle 12 is determined on the X-Z coordinate if the position of the towing device 18, the coupling angle θ, and the wheelbase length LT of the towed vehicle 12 are known. The turning center of the towed vehicle 12 is located on the extension line (straight line B) of the axle of the trailer wheel 22, and the intersection point with the X axis is set to the turning center G of the towed vehicle 12. That is, the turning-center calculator 56a can acquire the second turning center Gb of the towed vehicle 12 based on the coupling angle θ between the towing vehicle 10 and the towed vehicle 12 and the wheelbase length LT of the towed vehicle 12.

Figure 10:
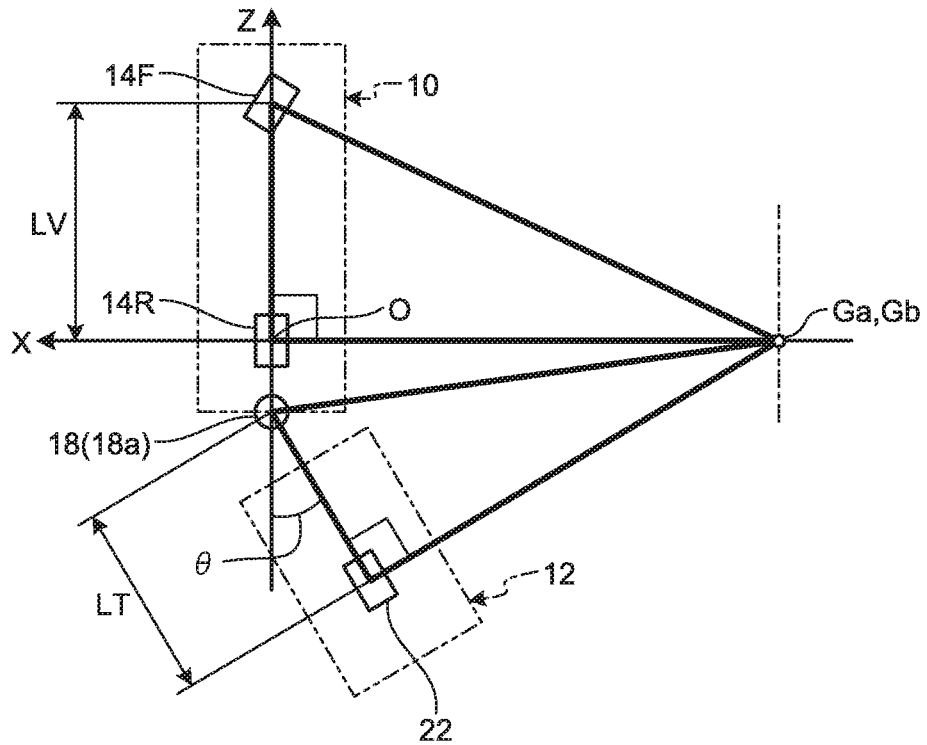
FIG. 10 is a schematic view illustrating a balanced state of the towing vehicle and the towed vehicle with a first turning center of the towing vehicle coinciding with a second turning center of the towed vehicle in the towing assistance device according to the embodiment.

As illustrated in FIG. 10, the balance determiner 56b determines that the towing vehicle 10 and the towed vehicle 12 connected by the towing device 18 are in the balanced state when the first turning center Ga and the second turning center Gb calculated by the turning-center calculator 56a are the same position (the same coordinates) or can be regarded as substantially the same position. That is, when the towing vehicle 10 is moved backward at the current steering angle, the balance determiner 56b determines that the towed vehicle 12 is movable backward in the coupling posture maintaining the current coupling angle θ.

Figure 11:
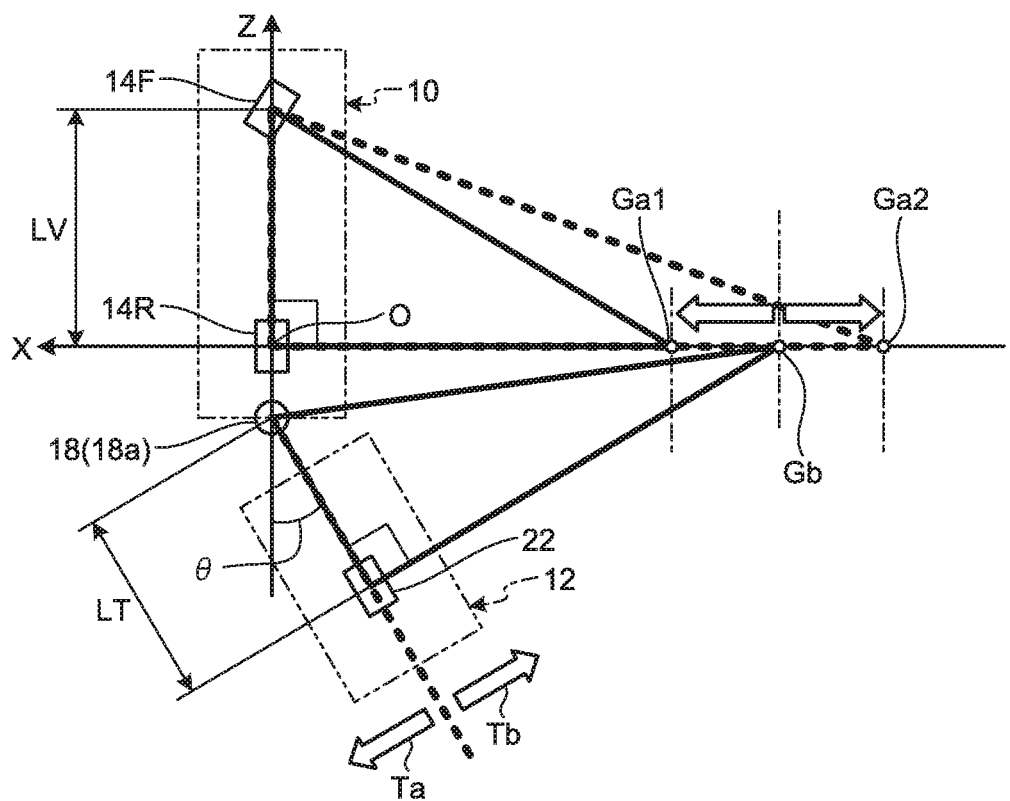
FIG. 11 is a schematic view illustrating a non-balanced state of the towing vehicle and the towed vehicle with the first turning center of the towing vehicle non-coinciding with the second turning center of the towed vehicle in the towing assistance device according to the embodiment.

Conversely, when the first turning center Ga and the second turning center Gb calculated by the turning-center calculator 56a are different as illustrated in FIG. 11, the balance determiner 56b determines that the towing vehicle 10 and the towed vehicle 12 connected by the towing device 18 are in the non-balanced state. As illustrated in FIG. 11, the second turning center Gb of the towed vehicle 12 is determined based on the coupling angle θ and the wheelbase length LT. Meanwhile, the towing vehicle 10 can freely change the steering angle by the steering of the steering 42. That is, the first turning center Ga can be changed. For example, when the steering 42 is further rotated rightward (clockwise) from the state of FIG. 10, the towing vehicle 10 turns with a smaller turning radius than that in FIG. 10. That is, the turning center of the towing vehicle 10 moves leftward on the X axis in FIG. 11 in the drawing, and coincides with the first turning center Ga1, for example. Conversely, when the steering 42 is further rotated leftward (counterclockwise) from the state of FIG. 10, the towing vehicle 10 turns with a larger turning radius than that in FIG. 10. That is, the turning center of the towing vehicle 10 moves rightward in the drawing on the X axis in FIG. 11, and becomes the first turning center Ga2, for example. When the towing vehicle 10 is moved backward to turn at the first turning center Ga1, the towed vehicle 12 moves backward while changing the coupling posture in a direction Ta in which the current coupling angle θ decreases. In this case, the balance determiner 56b determines that the towed vehicle 12 is not movable backward in the coupling posture with the current coupling angle θ maintained. In addition, when the towing vehicle 10 is moved backward to turn at the first turning center Ga2, the towed vehicle 12 moves backward while changing the coupling posture in a direction Tb in which the current coupling angle θ increases. In this case, the balance determiner 56b determines that the towed vehicle 12 is not movable backward in the coupling posture with the current coupling angle θ maintained.

Thus, when the towing vehicle 10 and the towed vehicle 12 are connected at the coupling angle θ, the towing vehicle 10 and the towed vehicle 12 can be placed in the balanced state between by adjusting the steering angle of the towing vehicle 10. That is, by the steering of the steering 42, it is possible to select a state where the behavior of the towed vehicle 12 following backward movement of the towing vehicle 10 can be easily recognized.

Returning to FIG. 5, the prediction line generator 58 generates a predicted motion line indicating a trajectory during movement of the rear wheel 14R of the towing vehicle 10 when the towing vehicle 10 moves backward based on the steering angle of the towing vehicle 10 acquired by the steering-angle acquirer 54b. The predicted motion line can be generated by a known method, and the prediction line generator 58 generates data for displaying a predicted motion line when, for example, the towing vehicle 10 travels rearward by 2 meters based on, for example, the current steering angle of the towing vehicle 10. The predicted motion line generated by the prediction line generator 58 is not limited to the predicted motion line corresponding to the rear wheel 14R, and may be a predicted motion line of a given part moving according to the steering angle of the towing vehicle 10. For example, the predicted motion line generated by the prediction line generator 58 may indicate a motion trajectory of a center (center point) of the towing vehicle 10. Alternatively, an outline of a vehicle body of the towing vehicle 10 may be displayed as the predicted motion line.

The notifier 60 notifies the driver of information indicating whether the current steering angle is a steering angle (balancing steering angle) at which the towing vehicle 10 and the towed vehicle 12 can be moved backward in the balanced state (coupling posture) among the selectable steering angles of the towing vehicle 10. For this notification, the notifier 60 includes, for example, modules such as a display-mode processing unit 60a, a vibration-motor controller 60b, and a sound-mode processing unit 60c.

Figure 12:
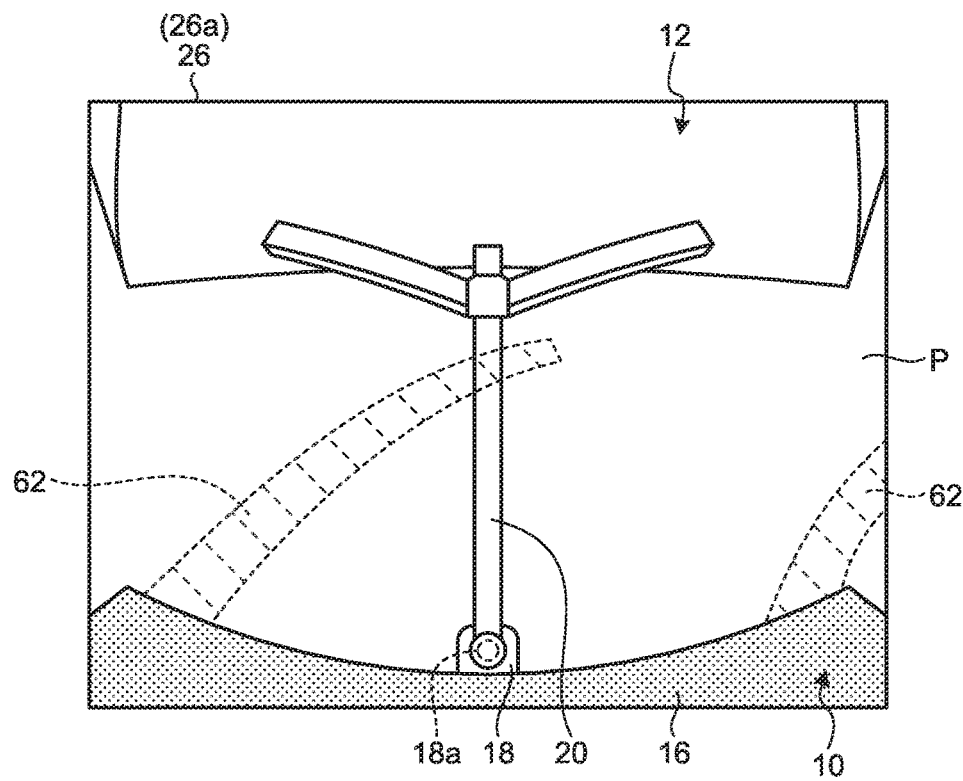
FIG. 12 is a view illustrating an exemplary notification screen when the towing vehicle and the towed vehicle are in the non-balanced state in the towing assistance device according to the embodiment.
Figure 13:
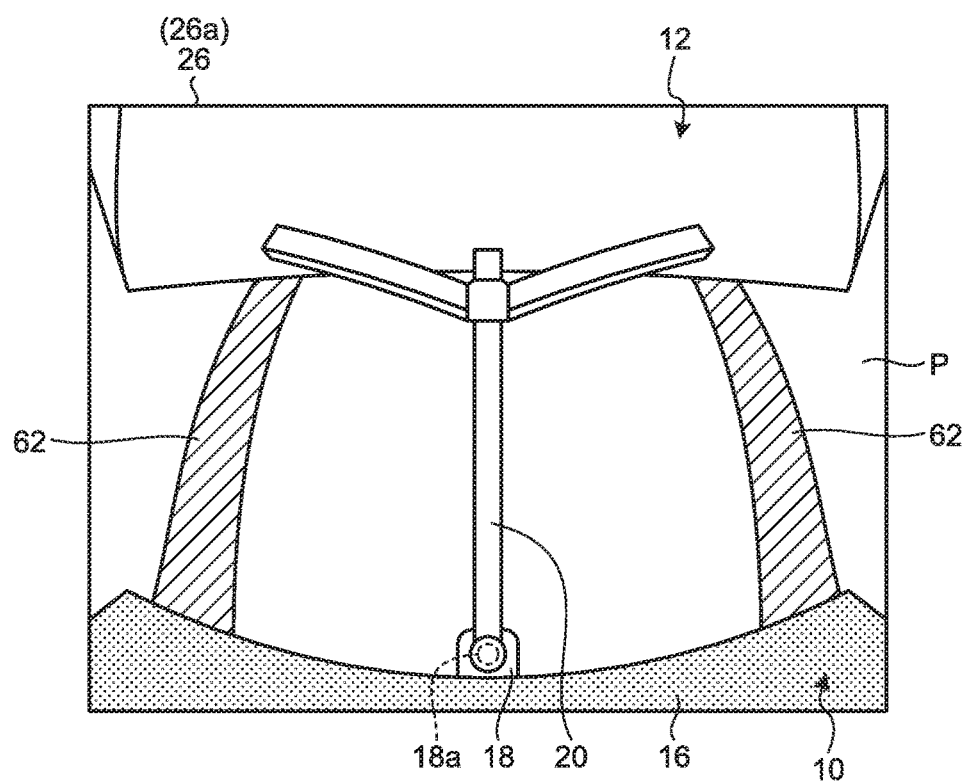
FIG. 13 is a view illustrating an exemplary notification screen showing that the towing vehicle and the towed vehicle are in the balanced state in the towing assistance device according to the embodiment.

The display-mode processing unit 60a changes visual notification of the balanced state (balancing steering angle of the towing vehicle 10) and the non-balanced state (non-balancing steering angle of the towing vehicle 10) of the towing vehicle 10 and the towed vehicle 12. For example, the notifier 60 changes a display mode of the predicted motion line generated by the prediction line generator 58 between the balanced state (balancing steering angle) and the non-balanced state (non-balancing steering angle). FIGS. 12 and 13 illustrate examples of the image P displayed on the screen 26a of the display device 26 according to a processing result of the display-mode processing unit 60a. FIGS. 12 and 13 illustrate "coupling angle θ≈0" as an example. FIG. 12 is an exemplary image P representing information (non-balanced state information) on the non-balancing steering angle at which the towing vehicle 10 and the towed vehicle 12 cannot move backward in the coupling posture at the coupling angle θ maintained. FIG. 13 illustrates exemplary image P representing information (balanced-state information) on the balancing steering angle at which the backward movement in the coupling posture is feasible. As illustrated in FIGS. 12 and 13, the image P is based on the image data generated by the imager 24, and includes the rear bumper 16 at a rear end of the towing vehicle 10, the towing device 18, the coupling member 20, and the front end of the towed vehicle 12. In addition, a predicted motion line 62 at the time of backward movement based on the current steering angle of the towing vehicle 10 generated by the prediction line generator 58 is displayed on the image P in superimposed manner. When a result of the balance determination of the balance determiner 56b is that the towing vehicle 10 and the towed vehicle 12 are in the non-balanced state, the display-mode processing unit 60a displays the predicted motion line 62 by, for example, a dashed line as illustrated in FIG. 12 or displays the color of the predicted motion line 62 in, for example, yellow, thereby notifying the driver of the non-balanced state. That is, in backward traveling along with the predicted motion line 62 (dashed line) at the current steering angle, the driver is notified of the information that the towing vehicle 10 and the towed vehicle 12 exhibit different behaviors. Meanwhile, when the balance determination of the balance determiner 56b shows that the towing vehicle 10 and the towed vehicle 12 are in the balanced state, the display-mode processing unit 60a displays the predicted motion line 62 as, for example, a solid line as illustrated in FIG. 13 or displays the color of the predicted motion line 62 in, for example, green, thereby notifying the driver of the balanced state. That is, in backward traveling along with the predicted motion line 62 (solid line) at the current steering angle, the driver is notified of the information that the towing vehicle 10 and the towed vehicle 12 exhibit the same behavior.

To move the towed vehicle 12 backward while maintaining the current coupling posture, following backward movement of the towing vehicle 10, that is, not to change the posture (orientation) of the towed vehicle 12, the driver steers the steering 42 to adjust the steering angle such that the predicted motion line 62 turns to a solid line and the display color turns to green as illustrated in FIG. 13. Conversely, to change the posture (orientation) of the towed vehicle 12, the driver adjusts the steering angle such that the predicted motion line 62 does not turn to the solid line or the display color turns to green. By issuing such notification, the towing vehicle 10 is moved backward while switching between the balanced state and the non-balanced state of the towing vehicle 10 and the towed vehicle 12 so that the towed vehicle 12 can be moved to a desired position while changing to a desired posture. By issuing the above notification, the driver can easily determine whether the towed vehicle 12 moves backward while behaving the same as the towing vehicle 10 or moves backward while changing a direction while behaving differently. This can reduce the driver's burden during travel, particularly, backward travel of the towed vehicle 12. In addition, the driver can easily understand the behavior of the towed vehicle 12, contributing to reduction in time required for backward towing. The display in the case of issuing the balance notification is not limited to changing the display mode of the predicted motion line 62 described above, and a display mode of display content other than the predicted motion line 62 may be changed. For example, a background color of the image P may be changed. In addition, an icon, a character, and an indicator indicating the balanced state and the non-balanced state may be displayed on the image P for the sake of discrimination. The display may be performed by blinking of the predicted motion line 62. In addition, a simple display may be performed using a display lamp or an indicator on a part other than the screen 26a of the display device 26 or the screen 34a of the display device 34. For display on the display device 34, movement of the line of sight during the operation of the steering 42 decreases as compared with display on the display device 26, which can further mitigate the operational burden during the backward towing.

The vibration-motor controller 60b notifies the driver of the information (balanced-state information) on the balancing steering angle at which the towing vehicle 10 can move backward in the coupling posture with the towed vehicle 12 while maintaining the coupling angle θ or the information (non-balanced state information) on the non-balancing steering angle at which the backward movement in the coupling posture is unfeasible, by changing a mode of the steering 42 (steering wheel), for example, changing a vibration pattern. For example, in the non-balanced state, the vibration-motor controller 60b does not drive the vibration motor 38c not to vibrate the steering 42. Meanwhile, in the balanced state, the vibration-motor controller 60b drives the vibration motor 38c to vibrate the steering 42. By the vibration, the driver can recognize that the towing vehicle 10 and the towed vehicle 12 are in the balanced state. This vibration pattern is exemplary. A short vibration may be repeatedly emitted in a short period in the balanced state and a long vibration may be repeatedly emitted in a long period in the non-balanced state. In another notification using the steering 42, the balance notification may be issued, for example, in accordance with a difference in a light emission mode of an LED incorporated in the steering 42. For example, a part of the steering 42 may emit green light in the balanced state, and emit yellow light in the non-balanced state.

The sound-mode processing unit 60c notifies the driver of the information (balanced-state information) on the balancing steering angle at which the towing vehicle 10 can move backward in the coupling posture together with the towed vehicle 12 while maintaining the coupling angle θ or the information (non-balanced state information) on the non-balancing steering angle at which the backward movement in the coupling posture is unfeasible, by changing a sound mode (different sound modes) output from the sound output device 28. For example, a short beep sound such as "beep, beep, beep" may be repeatedly output in a short period in the balanced state, and a long beep sound such as "peep, peep, peep" may be repeatedly output in a longer period in the non-balanced state. In addition, the sound-mode processing unit 60c may output a voice message that the vehicles are in balanced state or in non-balanced state, for example.

By the visual notification on the display device 26 and the display device 34, the driver can intuitively recognize a result of the notification. Meanwhile, the balance notification through the vibration-motor controller 60b and the sound-mode processing unit 60c is related to tactile sense or auditory sense, which makes it possible for the driver to focus on checking (viewing) the surrounding of the towing vehicle 10 and the towed vehicle 12. The balance notification through the display-mode processing unit 60a, and the vibration-motor controller 60b, and the sound-mode processing unit 60c may be selectable. For example, the balance notification may be issued through one of them, or any combination thereof. The driver may select the balance notification via the operation input 30, or the balance notification may be selected at the time of setting the module of the notifier 60, for example. The steering 42 includes backlash, therefore, the balancing steering angle or the non-balancing steering angle may be determined in consideration of an angle of backlash. In addition, the exact balancing steering angle may be determined, or a given angle range (±α) of the balancing steering angle may be set to a balance range. This makes it possible to avoid too strict determination on an unbalance angle and to move the towed vehicle 12 in a generally desired posture, facilitating the driving of the towing vehicle 10.

Figure 14:
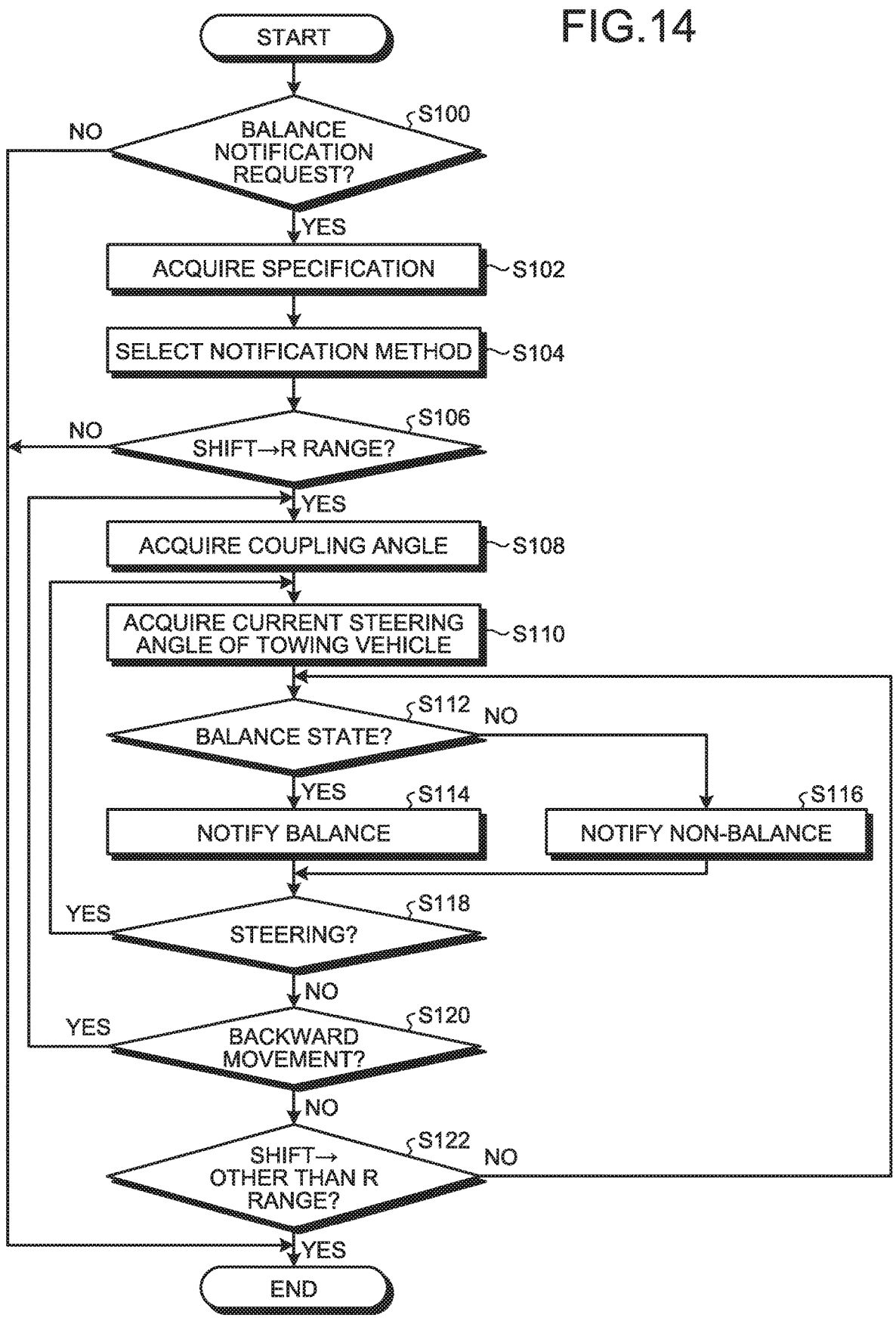
FIG. 14 is a flowchart of exemplary notification processing performed by the towing assistance device according to the embodiment.

Details of a towing assistance process executed by the towing assistance device (towing assistance system 100) configured as described above will be described with reference to a flowchart of FIG. 14.

First, the notification-request acquirer 54d checks whether a balance notification request has been issued (S100). With no issuance of the balance notification request via the operation unit 40g nor the operation input 30 (No in S100), this flow is temporarily ended. Upon issuance of the balance notification request via the operation unit 40g or the operation input 30 (Yes in S100), the specification acquirer 54c acquires the specifications of the towing vehicle 10 and the towed vehicle 12 (S102). For example, the wheelbase length LT of the towed vehicle 12 is acquired. The wheelbase length LT may be a value input by the driver via the operation input 30 or may be estimated by turning the towing vehicle 10 and the towed vehicle 12 coupled at the coupling angle θ forward, as described with reference to FIG. 9. The specification acquirer 54c acquires, for example, the wheelbase length LV of the towing vehicle 10, and the hitch distance LC, stored in advance from the ROM 40b or the SSD 40d. The imager 24 and other sensors of the towing assistance system 100 can detect coupling or non-coupling of the towed vehicle 12 as described above. Upon no detection of the coupling of the towed vehicle 12, the notification-request acquirer 54d may invalidate a request and temporarily end this flow even if the balance notification request has been made via the operation unit 40g or the operation input 30.

Subsequently, the notifier 60 receives selection of a notification method via the operation input 30 (S104). For example, one or two notification methods are selected from balance notification using the display device 26, balance notification using the display device 34, balance notification using the sound output device 28, balance notification using the steering 42. If the towing assistance system 100 or the driver initially sets the notification method, this step may be omitted. The operation in S100 to S104 may be performed at the time of coupling the towed vehicle 12 to the towing vehicle 10, for example, before starting driving the towing vehicle 10. In this case, the towed vehicle 12 is connected during a travel start preparation, and the towing assistance device checks receipt or non-receipt of the balance notification request at the time of backward travel in S100, acquires each specification in S102, and selects the notification method in S104. In addition, the towing assistance device may estimate the wheelbase length LT of the towed vehicle 12 during forward travel, for example, forward turning.

As described above, information on the balanced-state or non-balanced state of the towing vehicle 10 and the towed vehicle 12 is effective for moving the towing vehicle 10 coupled to the towed vehicle 12 backward. Thus, upon failing in acquiring from the shift sensor 46 information indicating that the transmission operator 52 (shift lever) is in the reverse range (R range) via the notification-request acquirer 54d (No in S106), the CPU 40a determines the balance notification as unnecessary and temporarily ends this flow. Meanwhile, when acquiring the information indicating the transmission operator 52 is in the reverse range (R range) via the notification-request acquirer 54d (Yes in S106), the CPU 40a acquires the coupling angle θ between the towing vehicle 10 and the towed vehicle 12 via the coupling-angle acquirer 54a (S108). The coupling-angle acquirer 54a acquires the coupling angle θ, for example, through image processing on the image based on image data generated by the imager 24. Furthermore, the steering-angle acquirer 54b acquires the current steering angle of the towing vehicle 10 from the information from the steering angle sensor 44 (S110).

Then, the determiner 56 determines whether the towing vehicle 10 and the towed vehicle 12 are currently in the balanced state (S112). That is, whether the current steering angle of the towing vehicle 10 is the balancing steering angle at which backward movement is feasible while maintaining the current coupling posture (coupling angle θ) of the towed vehicle 12 or the non-balancing steering angle at which backward movement in the coupling posture is unfeasible. Specifically, the turning-center calculator 56a calculates the first turning center Ga of the towing vehicle 10 from the wheelbase length LV and the current steering angle of the towing vehicle 10, and calculates the second turning center Gb of the towed vehicle 12 from the wheelbase length LT of the towed vehicle 12 and the coupling angle θ. Then, the balance determiner 56b determines the balanced state based on whether the first turning center Ga coincides with the second turning center Gb. When the towing vehicle 10 and the towed vehicle 12 are in the balanced state, that is, when the first turning center Ga coincides with the second turning center Gb (Yes in S112), the notifier 60 issues balance notification (S114). For example, when the balance notification using the display device 26 is selected as the notification method, the display-mode processing unit 60a executes display mode processing so as to display the image P on the display device 26 as illustrated in FIG. 13. For example, the display-mode processing unit 60a displays the predicted motion line 62 generated by the prediction line generator 58 based on the steering angle in green or by the solid line indicating the balance. As the driver is allowed to view such notification content, it can be understood that the towed vehicle 12 moves backward while maintaining the current coupling posture (coupling angle θ) when the towing vehicle 10 is moved backward while maintaining the current steering angle.

In addition, when the balance notification using the display device 34 is selected as the notification method, the display-mode processing unit 60a executes the display mode processing such that the display device 34 lights the LED and displays a mark or a character indicating the balanced state. In addition, when the balance notification using the steering 42 is selected as the notification method, the vibration-motor controller 60b drives the vibration motor 38c to vibrate the steering 42 in the vibration pattern indicating the balanced state. When the balance notification using the sound output device 28 is selected as the notification method, the sound-mode processing unit 60c executes sound mode processing such that the sound output device 28 outputs the sound indicating the balanced state (such as a beep sound, a melody, or a voice message).

In S112, when the first turning center Ga does not coincide with the second turning center Gb (No in S112), the notifier 60 issues unbalance notification (S116). For example, when the balance notification using the display device 26 is selected as the notification method, the display-mode processing unit 60a executes the display mode processing so as to display the image P on the display device 26 as illustrated in FIG. 12. For example, the display-mode processing unit 60a displays the predicted motion line 62 generated by the prediction line generator 58 based on the steering angle in yellow or by the broken line indicating the unbalance. As viewing such notification, the driver can understood that the towed vehicle 12 cannot maintain the current coupling posture (coupling angle θ) and moves backward with an increase or a decrease of the coupling angle θ, if the towing vehicle 10 is moved backward at the current steering angle. In a selected method other than the display device 26 as the notification method, notification is executed by the other notification method similarly to the balance notification. In this case, each notification is executed such that the balance notification and the unbalance notification can be clearly identified.

For the unbalance notification, with a large change of the coupling angle θ from the current angle, the towed vehicle 12 may be placed in jackknife coupling state with respect to the towing vehicle 10. The jackknife state refers to, for example, a state that the rear end of the towing vehicle 10 and the front end of the towed vehicle 12 are in contact with each other, and that the posture of the towed vehicle 12 is not controllable with the steering during backward movement of the towing vehicle 10 due to a too great coupling angle θ. In such a case, the notifier 60 may separately output information that the towed vehicle 12 is about to be in the jackknife state via the display device 26, the display device 34, the sound output device 28, or the steering 42. In the jackknife state, the jackknife state is likely to be resolved by driving the towing vehicle 10 forward.

During the notification processing by the notifier 60, the steering-angle acquirer 54b monitors a change or no change in the steering angle of the towing vehicle 10 (presence or absence of steering) (S118). When the steering angle of the towing vehicle 10 has changed beyond a threshold (for example, ±β°) that is recognized as turning (Yes in S118), the position of the first turning center Ga moves on the X axis as described in FIG. 11 as the towing vehicle 10 moves backward, and the relationship with the second turning center Gb of the towed vehicle 12 changes. Thus, the CPU 40a proceeds to S110 and repeats the subsequent processing in order to re-determine the balanced state. In addition, when the steering angle of the towing vehicle 10 is not recognized as turning (No in S118), that is, when the driver maintains the current steering angle, whether the towing vehicle 10 is traveling backward is checked (S120). For example, when the backward travel of the towing vehicle 10 can be checked based on the detection result of the wheel speed sensor 48 (Yes in S120), the CPU 40a proceeds to S108 and performs the processing again from the acquisition of the coupling angle θ between the towing vehicle 10 and the towed vehicle 12. That is, when the towing vehicle 10 travels backward in the non-balanced state, the coupling angle θ changes as described above, and the balanced state changes. During backward driving of the towing vehicle 10 in the balanced state, the coupling angle θ may change due to an external factor such as a road surface condition and weight balance of the towed vehicle 12. Thus, when the towing vehicle 10 travels backward, the balance is determined again regardless of the balanced state before the start of the backward travel.

When the backward traveling travel of the towing vehicle 10 cannot be checked (No in S120), that is, when the towing vehicle 10 is at a stop, the CPU 40a checks whether the transmission operator 52 (shift lever) has shifted to a range other than the reverse range (R range) via the notification-request acquirer 54d (S122). When the transmission operator 52 (shift lever) has shifted to the range other than the reverse range (R range) (Yes in S122), for example, when the transmission operator 52 has shifted to a parking range (P range) or a forward travel range (a D range), the CPU 40a determines that balance notification for reverse travel is unnecessary, and temporarily ends this flow. Meanwhile, when the transmission operator 52 (shift lever) maintains the reverse range (R range) (No in S122), the CPU 40a determines that there is no change in the steering angle of the towing vehicle 10 but the balance notification is still necessary for the reverse travel that may occur, proceeds to S112, updates a result of determination on the balanced state, and continues the notification on the display device 26.

In this manner, it is possible to notify the driver of the steering state of the towing vehicle 10 in which the behavior of the towed vehicle 12 can be easily controlled according to the towing assistance system 100 of the present embodiment. As a result, it is possible to mitigate the burden on steering of the driver particularly when the towed vehicle 12 is traveled backward. The above example illustrates that whether the towing vehicle 10 and the towed vehicle 12 are in the balanced state is notified when the towing vehicle 10 travels backward, but the present embodiment is not limited thereto. The notification may be issued when the towing vehicle 10 travels forward. The flowchart illustrated in FIG. 14 is exemplary, and it suffices to notify the driver of whether the steering angle of the towing vehicle 10 is the balancing steering angle at which the backward movement in the coupling posture is feasible when the towing vehicle 10 and the towed vehicle 12 coupled together travel backward. It is possible to replace the operation steps, or increase or decrease the number of the steps as appropriate, and attain similar effects.

Figure 15:
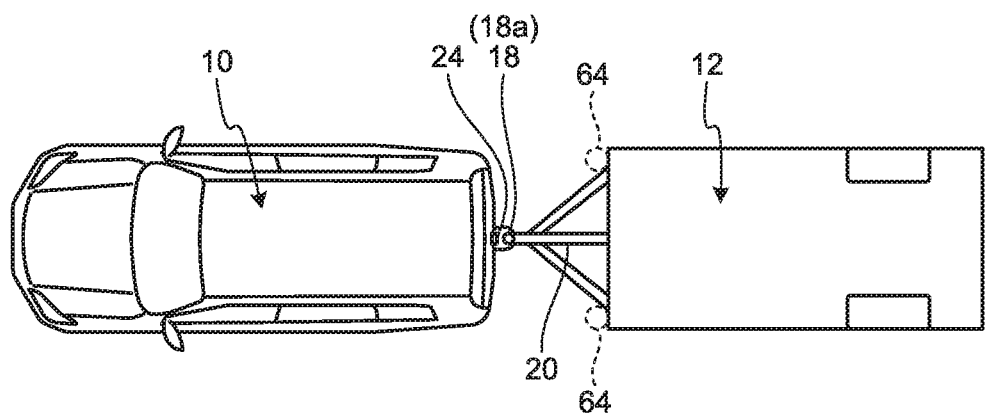
FIG. 15 is a view illustrating an exemplary set position of an indicator to display for facilitating understanding of a behavior of the towed vehicle in the towing assistance device according to the embodiment.
Figure 16:
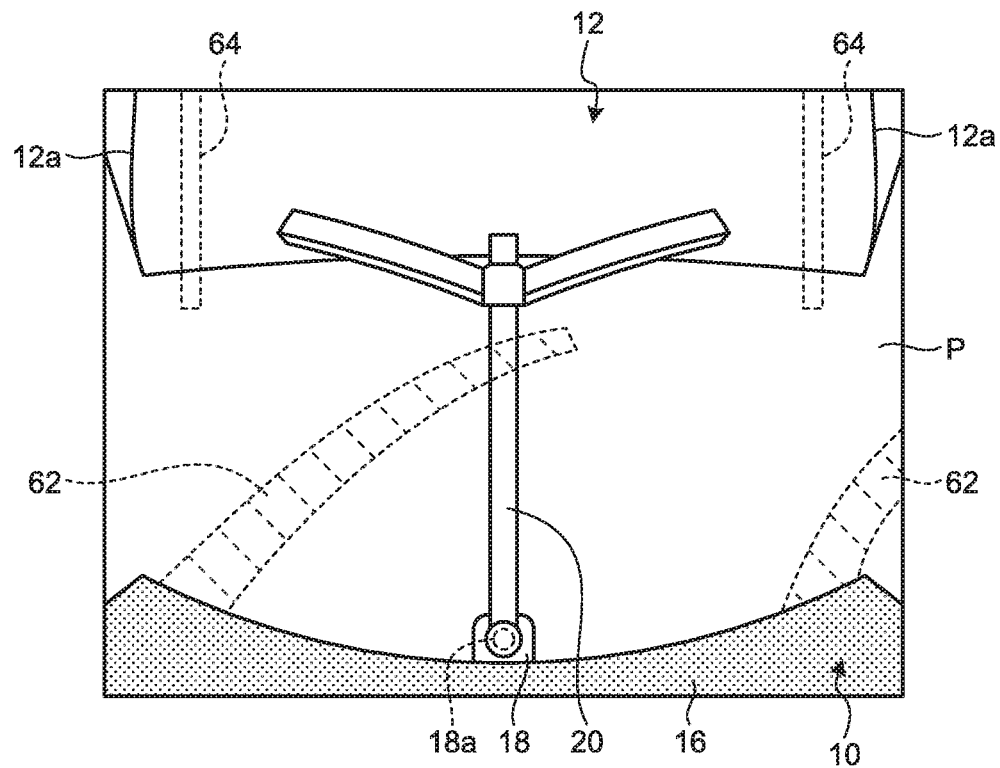
FIG. 16 is a view illustrating an exemplary image showing the indicator that facilitates understanding of the behavior of the towed vehicle in the towing assistance device according to the embodiment.

FIGS. 15 and 16 are examples of displaying an indicator, which facilitates understanding of a change in behavior of the towed vehicle 12, on the image P in a superimposed manner on the display device 26 when the towing vehicle 10 towing the towed vehicle 12 travels backward. FIG. 15 is a schematic view illustrating an exemplary set position of the indicator. As illustrated in FIG. 15, the imager 24 of the towing vehicle 10 can image the coupling posture of the towed vehicle 12 connected by the towing device 18. The image P based on the image data generated by the imager 24 includes the rear bumper 16 of the towing vehicle 10, the towing device 18, the coupling member 20, and the distal end of the towed vehicle 12, as illustrated in FIG. 16. The towing vehicle 10 coupled to the towed vehicle 12 travels backward, and the towed vehicle 12 moves while maintaining the coupling posture or while changing the coupling posture. However, the towing vehicle 10 often moves backward at a low speed, so that the towed vehicle 12 only slightly changes behavior during backward travel, which may be difficult for the driver to recognize. In particular, in the case of intentionally change the coupling posture of the towed vehicle 12 by changing the steering angle of the towing vehicle 10, the driver may have difficulty in recognizing the moving direction of the towed vehicle 12.

Thus, the notifier 60 displays an indicator 64 (for example, a stationary guide line), which facilitates understanding of the behavior of the towed vehicle 12, on the image P in superimposed manner when issuing the balance notification. As illustrated in FIG. 15, the indicator 64 is a pair of virtual objects with spacing equivalent to the width of the towing vehicle 10, for example, and is set in the vicinity of the front end of the towed vehicle 12, for example, at a position behind the rear end of the towing vehicle 10 by 2 meters. Since the imager 24 is fixed to the towing vehicle 10, the imaging range of the image P is constant regardless of the behavior of the towing vehicle 10 or the towed vehicle 12 as illustrated in FIG. 16. Then, the set position (display position) of the indicator 64 is also stationary on the image P. The indicator 64 can be, for example, a thin column extending in the vertical direction from the road surface in the image P. That is, the rear bumper 16, the towing device 18, and the indicator 64 are constantly displayed at given positions on the image P. Meanwhile, the towed vehicle 12 and the coupling member 20 move in the lateral direction (width direction) of the image P along with the change of the coupling angle θ. At this time, the stationary indicator 64 on the image P serves as a comparative criterion for the behavioral change of the towed vehicle 12 when the towed vehicle 12 travels backward. For example, a width edge 12a of the towed vehicle 12 (a vertical side of the towed vehicle 12) and the indicator 64 extending perpendicularly to the road surface are compared in the image P so that it becomes easy to understand the change in the relative position between the both, and it is possible to easily and significantly recognize the presence or absence of movement of the towed vehicle 12 in the vehicle width direction and a moving direction thereof. In addition, it is possible to easily know whether the towed vehicle 12 is currently biased leftward or rightward with respect to the towing vehicle 10 (a turning direction of the towed vehicle 12) even when the towed vehicle 12 is stopped, by comparing the indicator 64 with the towed vehicle 12. As a result, to intentionally change the posture of the towed vehicle 12, it is possible to determine whether a steering direction of the towing vehicle 10 is correct at earlier timing. That is, the driver can immediately correct the steering when the towed vehicle 12 starts moving in a direction different from an intended direction. By displaying the predicted motion line 62 together with the indicator 64, the driver can know both the moving direction of the towing vehicle 10 and the moving direction of the towed vehicle 12, that is, the behaviors of the towing vehicle 10 and the towed vehicle 12 as a whole.

Figure 17:
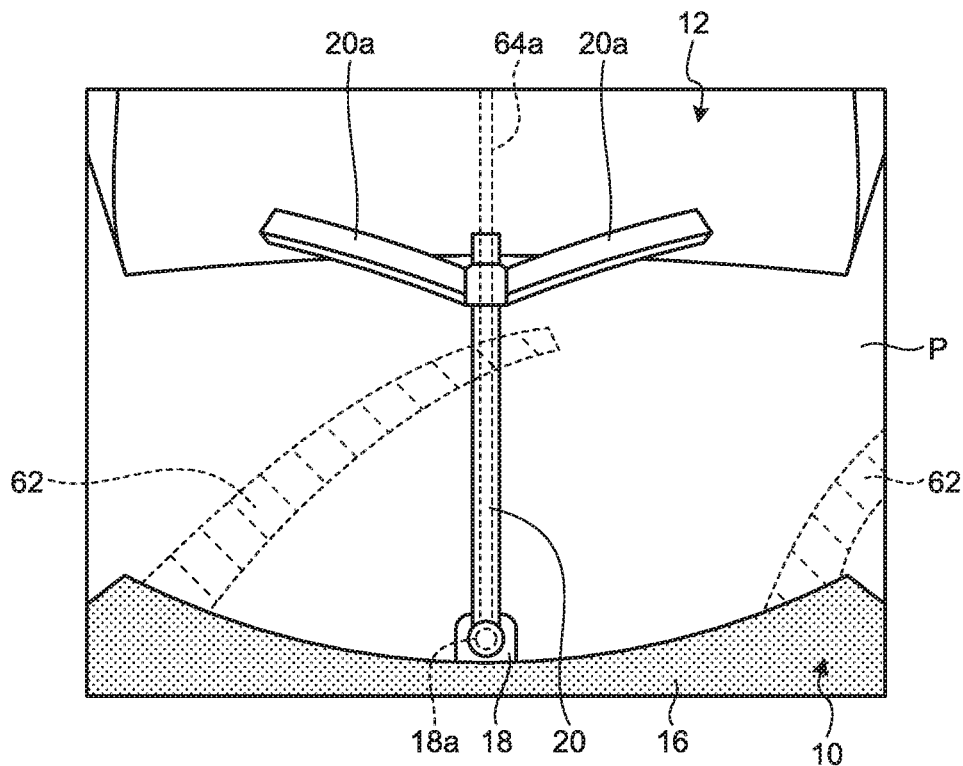
FIG. 17 is a view illustrating another example of the image showing the indicator that facilitates understanding of the behavior of the towed vehicle in the towing assistance device according to the embodiment.

FIG. 17 illustrates a modification of the indicator 64 illustrated in FIG. 16 as an example of displaying one indicator 64a (for example, a stationary guide line) that works to facilitate the driver's understanding of the behavior of the towed vehicle 12. The indicator 64a illustrated in FIG. 17 is set in a plane including the lengthwise axis of the towing vehicle 10 on a three-dimensional image (the image P) based on the image data generated by the imager 24. The towing device 18 is typically fixed on the lengthwise axis of the towing vehicle 10 (the lateral center of the vehicle) such that the towed vehicle 12 follows the towing vehicle 10 traveling straight forward. At the coupling angle θ being zero, the coupling member 20 that connects the towing vehicle 10 and the towed vehicle 12 is also located on the axis. Thus, the notifier 60 sets the indicator 64a as a comparative criterion for the coupling member 20. This makes it possible for the driver to easily understand the magnitude of the coupling angle θ between the towing vehicle 10 and the towed vehicle 12 and the turning direction. That is, the driver can easily understand the behavior of the towed vehicle 12. In the present embodiment the coupling member 20 includes a support bar 20a that horizontally branches on the towed vehicle 12 side. Thus, a change in the relative position between the indicator 64a and the support bar 20a can facilitate the driver's understanding of the behavior of the towed vehicle 12.

Although the indicators 64 and 64a have a linear shape as an example, the present embodiment is not limited thereto. The indicators 64 and 64a may have any shape as long as they are stationarily displayed on the image P with respect to the towed vehicle 12 changing in coupling posture. For example, the indicators 64 and 64a may be a circular or rectangular mark, and can attain the same effects.

Figure 18:
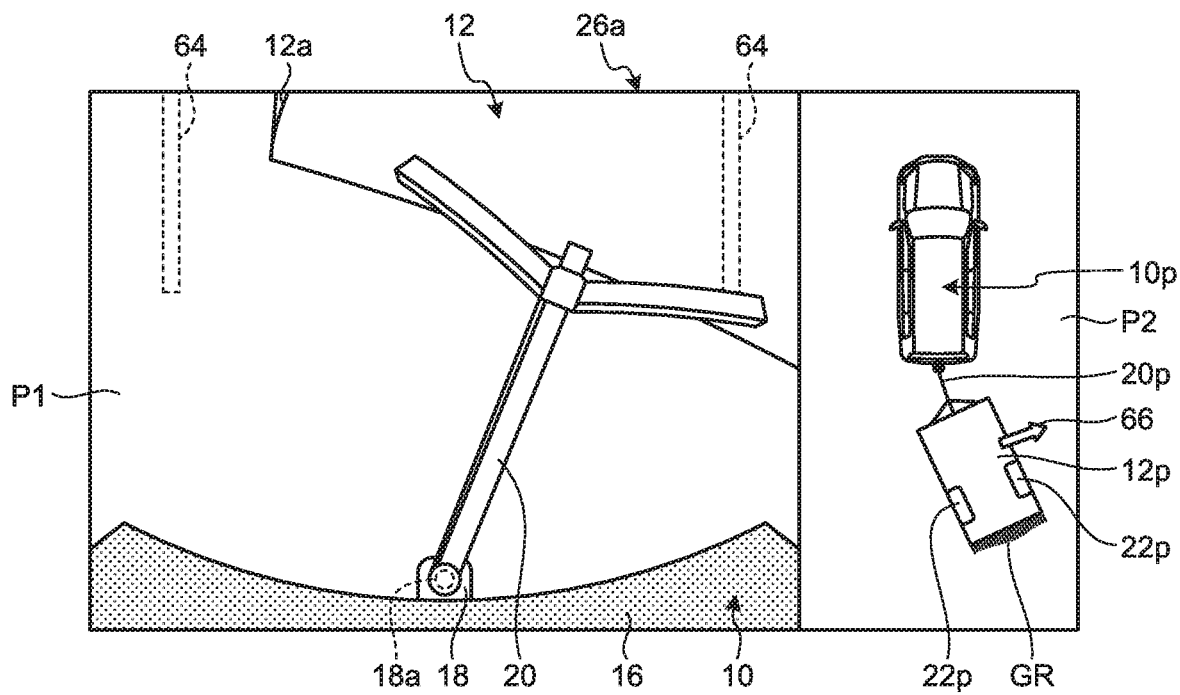
FIG. 18 is a view illustrating an example that an actual image and an overhead image, which illustrate the coupling between the towing vehicle and the towed vehicle, are displayed on one screen in the towing assistance device according to the embodiment.

FIG. 18 is a view illustrating an example that an actual image P1 and an overhead image P2 representing a coupling part between the towing vehicle 10 and the towed vehicle 12 are displayed on one screen (screen 26a) in order to facilitate the driver's understanding of the coupling state between the towing vehicle 10 and the towed vehicle 12. The actual image P1 is the same as the image P illustrated in another display example, and the display-mode processing unit 60a executes the display mode processing so as to display an image based on the image data generated by the imager 24. The overhead image P2 is obtained by viewing the towing vehicle 10 and the towed vehicle 12 from above. The display-mode processing unit 60a reads a towing-vehicle image 10p representing an overhead shape of the towing vehicle 10 stored in advance in the ROM 40b and the SSD 40d, and generates the overhead view image P2. As described above, the towing vehicles 10 can be coupled to towed vehicles 12 having various specifications. Thus, in displaying a towed-vehicle image 12p on the overhead image P2, the display-mode processing unit 60a generates the towed-vehicle image 12p simply representing the overhead shape of the towed vehicle 12, from the wheelbase length LT of the towed vehicle 12 acquired by the specification acquirer 54c and the coupling angle θ acquired by the coupling-angle acquirer 54a. The towing-vehicle image 10p and the towed-vehicle image 12p are connected together at the coupling angle θ through a coupling-member image 20p. In this case, it is not possible to acquire (estimate) information such as a length of the towed-vehicle image 12p behind the wheelbase length LT, that is, the length behind a trailer-wheel image 22p. Thus, the display-mode processing unit 60a subjects the towed-vehicle image 12p behind the trailer-wheel image 22p to gradation processing GR to gradual assimilate with the background color, thereby avoid display of inaccurate information, for example.

In this manner, the actual image P1 representing the coupling part between the towing vehicle 10 and the towed vehicle 12 and the overhead image P2 representing the towing-vehicle image 10p and the towed-vehicle image 12p are displayed on one screen, and thus, it is possible to objectively present the coupling state (coupling angle θ) between the towing vehicle 10 and the towed vehicle 12. As a result, it is possible to facilitate the driver's determination on whether to move the towed vehicle 12 leftward or rightward or to steer the towed vehicle 12 leftward or rightward at the time of controlling the angle (posture) of the towed vehicle 12. FIG. 18 illustrates the example that the towed-vehicle image 12p is subjected to the gradation processing. However, the towed-vehicle image 12p may be displayed up to the trailer-wheel image 22p, for example. As a more simplified example, only the front end of the towed-vehicle image 12p may be displayed. Conversely, the towed-vehicle image 12p having a given shape not subjected to the gradation processing may be displayed. At the time of inputting specification, more detailed information such as a total length of the towed vehicle 12 may be input to generate the towed-vehicle image 12p representing the whole towed vehicle 12.

FIGS. 12 and 13 illustrate the examples that the steering angle of the towing vehicle 10 is the balancing steering angle at which the towed vehicle 12 can move backward while maintaining the current coupling posture or the non-balancing steering angle at which the coupling posture cannot be maintained, is notified by changing the display mode of the predicted motion line 62. In another embodiment, a notification mark 66 may be added to the towed-vehicle image 12p for the notification as illustrated in FIG. 18, in place of the notification with the predicted motion line 62. The notification mark 66 may be displayed when the steering angle of the towing vehicle 10 is the non-balancing steering angle and may be not displayed at the balancing steering angle. The notification mark 66 may indicate the moving direction of the towed vehicle 12 when the towing vehicle 10 travels backward at the current steering angle. In FIG. 18, the notification mark 66 indicates leftward movement (turning clockwise) of the towed vehicle 12 as an example. The moving direction of the towed vehicle 12 can be estimated from the positional relationship between the first turning center Ga (Ga1 or Ga2) and the second turning center Gb calculated by the turning-center calculator 56a as illustrated in FIG. 11. In addition, the arrow of the notification mark 66 may be changed in length in accordance with a magnitude of a difference between the current steering angle of the towing vehicle 10 and the balancing steering angle, using this positional relationship. For example, when the current steering angle is significantly different from the balancing steering angle, the arrow length of the notification mark 66 is displayed to be longer, and the arrow length becomes shorter as the current steering angle approaches the balancing steering angle. That is, at the current steering angle matching the balancing steering angle, the notification mark 66 is not displayed. Such display can facilitate the driver's understanding how to adjust the magnitude of the difference between the current steering angle and the balancing steering angle and the steering angle in order to bring the towed vehicle 12 into a balanced posture or how to adjust the steering angle in order to intentionally adjust an unbalanced posture. The notification mark 66 is not limited to the arrow, and may be a mark having another shape. In addition, a display mode (a display color, a line type, or blinking or non-blinking display) of the notification mark 66 may be changed in accordance with the magnitude of the difference between the current steering angle and the balancing steering angle. In this case, it becomes easier for the driver to more intuitively understand the information on the steering angle by the notification mark 66.

FIG. 18 illustrates the example that a display area of the actual image P1 is larger than a display area of the overhead image P2 on the display device 26. However, the overhead image P2 may be displayed in larger size than the actual image P1. In this case, the coupling between the towing vehicle 10 and the towed vehicle 12 can be displayed more easily. In addition, the actual image P1 may be displayed on the display device 26, and the overhead image P2 may be displayed on the display device 34. In this case, it is possible to secure a wide display area of the actual image P1, and the visibility of the actual image P1 can be improved.

Figure 19:
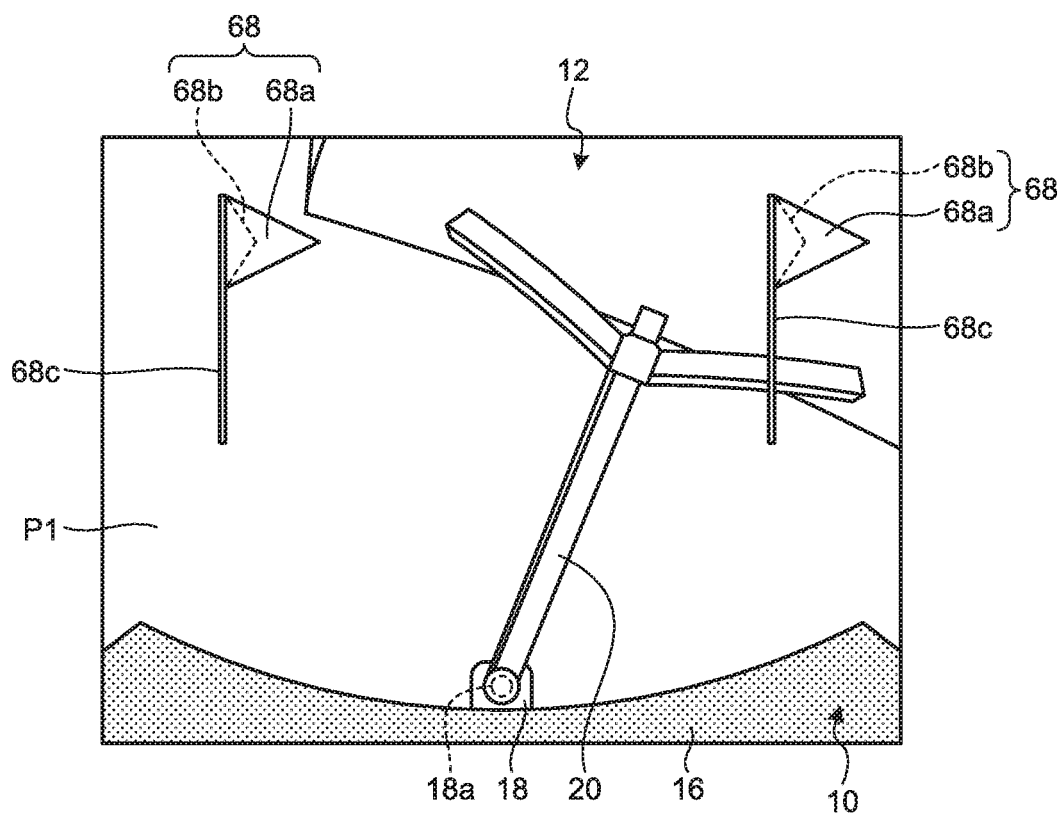
FIG. 19 is a view illustrating an exemplary screen on which indicators for a predicted turning direction of the towed vehicle and a magnitude of a difference between a balancing steering angle and a non-balancing steering angle, which enables backward movement in a coupling posture, are superimposed, while the towing vehicle the towed vehicle are in the balanced state, in the towing assistance device according to the embodiment.

FIG. 19 is a view illustrating an example that the notification mark 66 indicated in the overhead image P2 of FIG. 18 is displayed as the actual image P1. In this case, a notification mark 68 having a triangular flag shape, for example, is displayed instead of the predicted motion line 62 illustrated in FIGS. 12 and 13. This notification mark 68 indicates a direction in which the notification mark 68 (flag) flutters, that is, the moving direction of the towed vehicle 12 when the towing vehicle 10 moves backward at the current steering angle, which is similar to the notification mark 66 of FIG. 18. In addition, a size of the flag of the notification mark 68 is changed in accordance with the magnitude of the difference between the current steering angle of the towing vehicle 10 and the balancing steering angle. That is, the notifier 60 displays at least one of the turning direction of the towed vehicle 12 when the towed vehicle 12 moves backward and the magnitude of the difference between the balancing steering angle that enables backward movement in the current coupling posture between the towing vehicle 10 and the towed vehicle 12. For example, when the current steering angle and the balancing steering angle are significantly different from the result of the calculation of the turning-center calculator 56a, the display-mode processing unit 60a displays a notification mark 68a of a large flag. Then, the display-mode processing unit 60a displays the mark such that the size of the flag decreases as the current steering angle approaches the balancing steering angle. For example, the display-mode processing unit 60a executes the processing to display a notification mark 68b indicated by a small flag. That is, the display-mode processing unit 60a executes the processing to hide the flag when the current steering angle coincides with the balancing steering angle (in the balanced state). In this case, a pole 68c supporting the flag may also be hidden.

In another embodiment, the pole 68c of the notification mark 68 may be used as a comparative criterion for the behavioral change of the towed vehicle 12 when the towed vehicle 12 travels backward, which is similar to the indicator 64 illustrated in FIG. 16. In this case, if the steering angle of the towing vehicle 10 reaches the balancing steering angle, the pole 68c is kept displayed. In this manner, the notification mark 68 can contribute to the notification of the moving direction of the towed vehicle 12 moving backward while maintaining the steering angle, the notification of the magnitude of the difference between the current steering angle and the balancing steering angle, improvement in recognition of the behavioral change of the towed vehicle 12. If the notification mark 68 functions in the same manner as the indicator 64, it is desirable that the pair of notification marks 68 be displayed with spacing equivalent to the width of the towing vehicle 10, for example.

The flag shape of the notification mark 68 displayed is a triangle as an example, however, the notification mark 68 can have any shape as long as it works to notify the driver of the lateral direction with reference to the pole 68c or the magnitude of the difference in the steering angle, and attain the same effects. In another embodiment, for example, in the case of setting the notification mark 68 as an indicator of a moving direction of the towed vehicle 12, the notification mark 68 may be a rectangular or circular mark, or other shapes, or characters displayed leftward or rightward with respect to the pole 68c. Similarly, for example, in the case of setting the notification mark 68 as an indicator of the magnitude of the difference in steering angle, the notification mark 68 may be a rectangular or circular mark with no poles 68c, a mark of another shape, and a character, for example.

Figure 20:
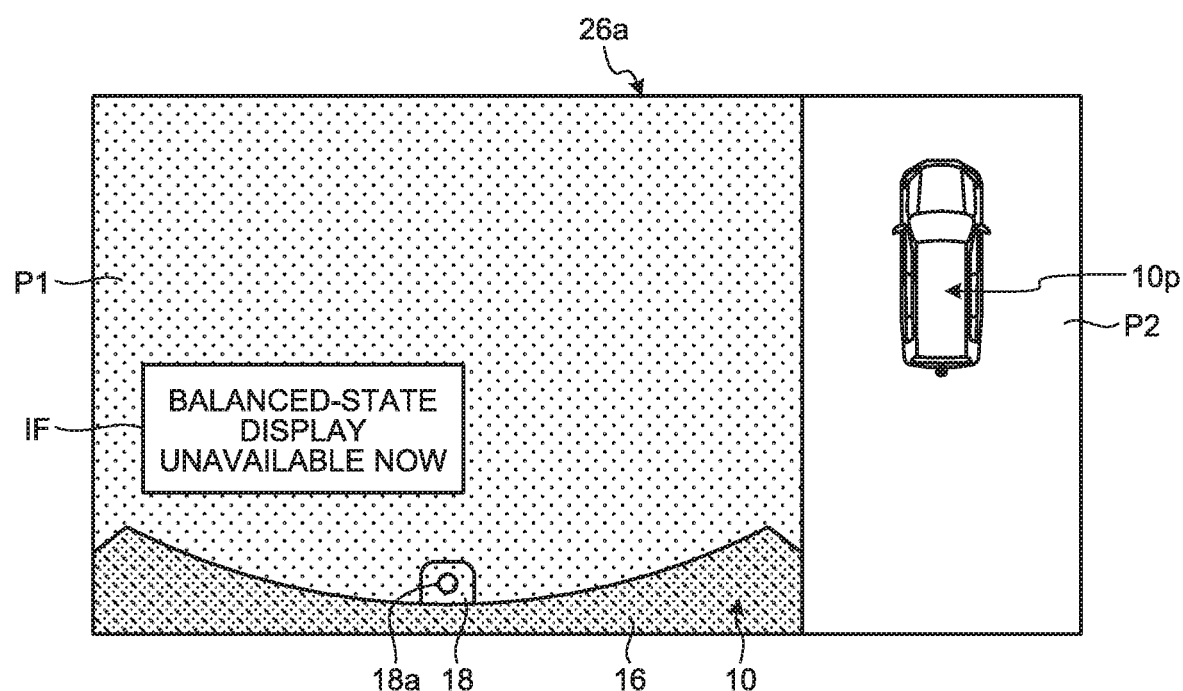
FIG. 20 is a view illustrating an exemplary screen to display when notification is unfeasible in spite of issuance of a notification request for showing the balanced state in the towing assistance device according to the embodiment.

The above embodiments and modification have described the example that the towing assistance system 100 issues the notification on the display device 26 in response to the driver's issuance of the notification request for the information on the balancing steering angle/non-balancing steering angle via the operation input 30 while the towed vehicle 12 is connected to the towing vehicle 10. In this case, it is necessary to detect the coupling state (coupling angle θ) between the towing vehicle 10 and the towed vehicle 12 in order to determine the balanced state/non-balanced state, however, the coupling state may not be sufficiently detected. The coupling state can be detected, for example, from image data of the towed vehicle 12 and the coupling member 20 by the imager 24. However, it may be too dark to sufficiently identify the towed vehicle 12 and the coupling member 20 from the image. In addition, for example, in detecting the coupling state from an identification mark of the towed vehicle 12 or the coupling member 20, the identification mark may be dirty with mud or something and non-detectable. Furthermore, the imager 24 or an image processing module may have a failure and be unable to detect or stably detect. Thus, if the coupling state (balanced state) is not detectable in response to the notification request for the information on the balancing steering angle, the system 100 cannot provide accurate information. In this case, the notifier 60 refrains from issuing the balance information. This can mitigate a driver's annoyance or discomfort due to insufficient information. For example, as illustrated in FIG. 20, information on balance notification (for example, the notification mark 68 in FIG. 19, the towed-vehicle image 12p of the overhead image P2 in FIG. 18) or the towed vehicle 12 in the actual image P1 are not displayed to avoid insufficient notification. In addition, in this case, the display device 26 may display a message IF that the notification is unfeasible, for example, "balanced-state display unavailable now" on the screen 26a. By such non-notification or positive notification of unavailability, the driver (user) can easily understand an operation state of the towing assistance system 100. For another example, the notification may not be issued with the vibration of the steering wheel or by sound. In this case, the notification of unavailability may be issued separately, which can attain and the same or like effects as the above examples.

The above embodiment has described the example of issuing additional warning in advance on the display device 26 when the unbalance notification is issued during the backward travel and the coupling angle θ largely changes from the current angle, i.e., the jackknife state is about to occur. In a modification, the current coupling state between the towing vehicle 10 and the towed vehicle 12 is the non-balanced state during the backward travel and they cannot be placed in the balanced state irrespective of the steering angle (steered in t maximum steering angle range, that is, within a steerable range), such a situation may be notified. For example, in the jackknife state, the display-mode processing unit 60a may change the display mode of the towed-vehicle image 12p of the overhead image P2 in FIG. 18, for example, to a different display mode in normal state (that the towing vehicle 10 and the towed vehicle 12 can be placed in the balanced state). For example, the towed-vehicle image 12p is displayed in red, by a dashed line, or by blinking. In addition, a display transmittance of the towed-vehicle image 12p may be increased, for example, to a substantially non-visible level as a warning display representing that the towed vehicle 12 is not controllable. In addition, as the warning display, for example, the towed vehicle 12 and the coupling member 20 of the actual image P1 of FIG. 19 may be displayed in red or the entire background of the actual image P1 may be displayed in red. Thus, if the towing vehicle 10 and the towed vehicle 12 cannot be returned to the balanced state during backward travel, the display may allow the driver to promptly recognize such a situation. This makes it possible for the driver to correct his or her driving at earlier timing before the situation becomes serious. By moving the towing vehicle 10 forward at earlier timing, for example, the control over the towed vehicle 12 can be recovered more smoothly, which can reduce the driver's burden on the driving the towing vehicle 10 and the towed vehicle 12. In addition, in a notification mode through the vibration of the steering wheel or by sound, the towing vehicle 10 and the towed vehicle 12 may not be able to be set in the balanced state. In such a case, warning may be issued by vibration or sound different from that in a normal state (the towing vehicle 10 and the towed vehicle 12 can be placed in the balanced state). In this case, the same effects as the above examples can be also attained.

In this manner, the driver is notified of whether the current steering angle of the towing vehicle 10 is the steering angle at which the coupling posture of the towing vehicle 10 and the towed vehicle 12 can be maintained in an easily recognizable mode according to the towing assistance system 100 of the present embodiment. This makes it possible for the driver to more easily, more accurately reversely drive the towed vehicle 12, which can contribute to reducing the driver's steering load.

A towing assistance program to be executed by the CPU 40a of the present embodiment may be recorded and provided in an installable or executable file format on a computer-readable recording medium such as a CD-ROM, a flexible disk (FD), a CD-R, and a digital versatile disk (DVD).

Furthermore, the towing assistance program may be stored on a computer connected to a network such as the Internet and provided by being downloaded via a network. The towing assistance program executed in the present embodiment may be provided or distributed via a network such as the Internet.

While the embodiments and modifications of the present invention have been described, these embodiments and modifications are presented as examples and are not intended to limit the scope of the invention. These novel embodiments can be implemented in various other modes, and various omissions, substitutions, and alterations can be made within a scope not departing from a gist of the invention. These embodiments and modifications thereof are included in the scope and the gist of the invention, and are included in the invention described in the claims and the equivalent scope thereof.

The invention claimed is:

1. A towing assistance device comprising:
a processor configured to implement:
an acquirer that acquires a coupling angle between a towing vehicle and a towed vehicle;
a determiner that determines whether the towed vehicle is movable backward in a coupling posture with the coupling angle maintained, when the towing vehicle is moved backward at a current steering angle; and
a notifier that issues information on a steering angle at which the towed vehicle is movable backward in the coupling posture, among selectable steering angles of the towing vehicle,
wherein the determiner acquires a first turning center of the towing vehicle and a second turning center of the towed vehicle to determine whether the towed vehicle is movable backward in the coupling posture, from a positional relationship between the first turning center and the second turning center, the first turning center being defined by the steering angle of the towing vehicle and a wheelbase length of the towing vehicle, the second turning center being defined by the coupling angle and a wheelbase length of the towed vehicle.

2. The towing assistance device according to claim 1, wherein
the acquirer acquires the coupling angle from image data of a region including at least a coupling part of the towing vehicle and the towed vehicle.

3. The towing assistance device according to claim 1, wherein
the notifier issues information on a balancing steering angle and information on a non-balancing steering angle by changing a mode of a steering wheel of the towing vehicle, the balancing steering angle representing an angle at which the towed vehicle is movable backward in the coupling posture, the non-balancing steering angle representing an angle at which the towed vehicle is not movable backward in the coupling posture.

4. The towing assistance device according to claim 1, wherein
the notifier issues information on a balancing steering angle and information on a non-balancing steering angle in different voice modes, the balancing steering angle representing an angle at which the towed vehicle is movable backward in the coupling posture, the non-balancing steering angle representing an angle at which the towed vehicle is not movable backward in the coupling posture.

5. The towing assistance device according to claim 1, wherein the notifier:
displays an image representing at least the towed vehicle on a display device, and
displays an indicator on the image in a superimposed manner, the indicator being stationary in a given position with respect to the towing vehicle and serving as a comparative criterion for behavioral change of the towed vehicle moving backward.

6. The towing assistance device according to claim 1, wherein
the notifier displays, on a display device, an actual image based on image data of a region including a coupling part of the towing vehicle and the towed vehicle, and an overhead image of the towing vehicle and the towed vehicle coupled at the coupling angle based on the image data.

7. The towing assistance device according to claim 1, wherein
upon issuance of a notification request for information on a steering angle at which the towed vehicle is movable backward in the coupling posture and being unable to acquire the coupling angle between the towing vehicle and the towed vehicle, the notifier refrains from issuing the information.

8. The towing assistance device according to claim 1, wherein
when, in moving backward, the towing vehicle cannot transition, with a steering in an allowable steering range, to a balancing steering angle at which the towing vehicle and the towed vehicle are movable backward in the coupling posture at the maintained coupling angle, the notifier issues the information in a mode different from a mode when the towing vehicle is movable to the balancing steering angle.

9. A towing assistance device comprising:
a processor configured to implement:
an acquirer that acquires a coupling angle between a towing vehicle and a towed vehicle;
a determiner that determines whether the towed vehicle is movable backward in a coupling posture with the coupling angle maintained, when the towing vehicle is moved backward at a current steering angle; and
a notifier that issues information on a steering angle at which the towed vehicle is movable backward in the coupling posture, among selectable steering angles of the towing vehicle 1, wherein the notifier:
displays a predicted motion line on a display device, the predicted motion line being of the towing vehicle in the backward movement of the towing vehicle at the current steering angle, and
displays information on a balancing steering angle and information on a non-balancing steering angle with the predicted motion line in different display modes, the balancing steering angle representing an angle at which the towed vehicle is movable backward in the coupling posture, the non-balancing steering angle representing an angle at which the towed vehicle is not movable backward in the coupling posture.

10. A towing assistance device comprising:
a processor configured to implement:
an acquirer that acquires a coupling angle between a towing vehicle and a towed vehicle;
a determiner that determines whether the towed vehicle is movable backward in a coupling posture with the coupling angle maintained, when the towing vehicle is moved backward at a current steering angle; and
a notifier that issues information on a steering angle at which the towed vehicle is movable backward in the coupling posture, among selectable steering angles of the towing vehicle, wherein the notifier:
displays, on a display device, an image representing at least the towed vehicle, and
displays, together with the image, as a non-balancing steering angle at which the towed vehicle is not movable backward in the coupling posture, at least one of a turning direction of the towed vehicle moving backward and a magnitude of a difference from the balancing steering angle at which the towed vehicle is movable backward in the coupling posture.

* * * * *